(12) United States Patent
Brychell et al.

(10) Patent No.: US 7,318,063 B2
(45) Date of Patent: Jan. 8, 2008

(54) MANAGING XML DOCUMENTS CONTAINING HIERARCHICAL DATABASE INFORMATION

(75) Inventors: Joseph J. Brychell, Kirkland, WA (US); Xavier Bocken, Geneva (CH); Robert Jervis, Bellevue, WA (US); Kamaljit S. Bath, Redmond, WA (US); Arungundram Narendran, Sammamish, WA (US); Mikhail Vassiliev, Sammamish, WA (US); Danny van Velzen, Redmond, WA (US); Nora S. Selim, Nasr (EG); Hagen Green, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 378 days.

(21) Appl. No.: 10/783,702

(22) Filed: Feb. 19, 2004

(65) Prior Publication Data
US 2005/0187973 A1 Aug. 25, 2005

(51) Int. Cl.
*G06F 7/00* (2006.01)
(52) U.S. Cl. .................... 707/100; 707/104.1
(58) Field of Classification Search ........... 715/513, 715/530, 500; 707/1–10, 100, 101, 102, 707/104.1
See application file for complete search history.

(56) References Cited

U.S. PATENT DOCUMENTS

| | | | |
|---|---|---|---|
| 4,498,147 A | 2/1985 | Agnew et al. | |
| 4,514,800 A | 4/1985 | Gruner et al. | |
| 4,641,274 A | 2/1987 | Swank | |
| 4,674,040 A | 6/1987 | Barker et al. | |
| 4,723,211 A | 2/1988 | Barker et al. | |
| 4,739,477 A | 4/1988 | Barker et al. | |

(Continued)

FOREIGN PATENT DOCUMENTS

EP 0841615 11/1999

(Continued)

OTHER PUBLICATIONS

Bruce Halberg et al, "Using Microsoft Excel 97", Published 1997, Bestseller Edition, Pertinent pp. 1-9, 18-25, 85-89, 98-101, 106-113, 124-127, 144-147, 190-201, 209-210, 218-227, 581-590, 632-633, 650-655, 712-714.

(Continued)

*Primary Examiner*—Wilson Lee

(57) ABSTRACT

Systems, methods, and computer program products for management of data that is stored in a hierarchical format such as, e.g., a relational database, when the data is retrieved and manipulated using a schema-driven format such as, e.g., XML are disclosed. In one implementation a copy of the XML data retrieved from the database and is generated and each logical unit in at least one of the original XML data or the copy of the XML data is annotated in a manner that uniquely identifies each logical unit. For example, each XML node may be assigned a unique numerical or string identifier. As the data is manipulated, algorithms may be implemented to use the annotations to track changes to the XML data and to ensure that the manipulated XML data complies with one or more required data formats. When the XML data is ready to be transferred back to the database(s) from which it was obtained, a series of operations are implemented to validate the data and to determine the nature of operation to be performed to restore the data to the databases.

31 Claims, 8 Drawing Sheets

U.S. PATENT DOCUMENTS

| | | |
|---|---|---|
| 4,815,029 A | 3/1989 | Barker et al. |
| 4,847,749 A | 7/1989 | Collins et al. |
| 4,910,663 A | 3/1990 | Bailey |
| 4,933,880 A | 6/1990 | Borgendale et al. |
| 4,962,475 A | 10/1990 | Hernandez et al. |
| 5,072,412 A | 12/1991 | Henderson, Jr. et al. |
| 5,179,703 A | 1/1993 | Evans |
| 5,182,709 A | 1/1993 | Makus |
| 5,187,786 A | 2/1993 | Densmore et al. |
| 5,191,645 A | 3/1993 | Carlucci et al. |
| 5,195,183 A | 3/1993 | Miller et al. |
| 5,204,947 A | 4/1993 | Bernstein et al. |
| 5,206,951 A | 4/1993 | Khoyi et al. |
| 5,218,672 A | 6/1993 | Morgan et al. |
| 5,237,680 A | 8/1993 | Adams et al. |
| 5,249,275 A | 9/1993 | Srivastava |
| 5,274,803 A | 12/1993 | Dubin et al. |
| 5,297,249 A | 3/1994 | Bernstein et al. |
| 5,297,283 A | 3/1994 | Kelly, Jr. et al. |
| 5,313,631 A | 5/1994 | Kao |
| 5,313,646 A | 5/1994 | Hendricks et al. |
| 5,317,686 A | 5/1994 | Salas et al. |
| 5,333,317 A | 7/1994 | Dann |
| 5,339,423 A | 8/1994 | Beitel et al. |
| 5,339,424 A | 8/1994 | Fushimi |
| 5,341,478 A | 8/1994 | Travis, Jr. et al. |
| 5,369,766 A | 11/1994 | Nakano et al. |
| 5,369,778 A | 11/1994 | San Soucie et al. |
| 5,371,675 A | 12/1994 | Greif et al. |
| 5,377,323 A | 12/1994 | Vasudevan |
| 5,379,419 A | 1/1995 | Heffernan et al. |
| 5,381,547 A | 1/1995 | Flug et al. |
| 5,390,325 A | 2/1995 | Miller |
| 5,396,623 A | 3/1995 | McCall et al. |
| 5,408,665 A | 4/1995 | Fitzgerald |
| 5,410,646 A | 4/1995 | Tondevold et al. |
| 5,410,688 A | 4/1995 | Williams et al. |
| 5,412,772 A | 5/1995 | Monson |
| 5,434,975 A | 7/1995 | Allen |
| 5,436,637 A | 7/1995 | Gayraud et al. |
| 5,438,659 A | 8/1995 | Notess et al. |
| 5,440,744 A | 8/1995 | Jacobson et al. |
| 5,446,842 A | 8/1995 | Schaeffer et al. |
| 5,459,865 A | 10/1995 | Heninger et al. |
| 5,481,722 A | 1/1996 | Skinner |
| 5,497,489 A | 3/1996 | Menne |
| 5,504,898 A | 4/1996 | Klein |
| 5,517,655 A | 5/1996 | Collins et al. |
| 5,535,389 A | 7/1996 | Elder et al. |
| 5,542,070 A | 7/1996 | LeBlanc et al. |
| 5,550,976 A | 8/1996 | Henderson et al. |
| 5,551,035 A | 8/1996 | Arnold et al. |
| 5,572,643 A | 11/1996 | Judson |
| 5,572,648 A | 11/1996 | Bibayan |
| 5,577,252 A | 11/1996 | Nelson et al. |
| 5,581,686 A | 12/1996 | Koppolu et al. |
| 5,581,760 A | 12/1996 | Atkinson et al. |
| 5,602,996 A | 2/1997 | Powers, III et al. |
| 5,608,720 A | 3/1997 | Biegel et al. |
| 5,625,783 A | 4/1997 | Ezekiel et al. |
| 5,627,979 A | 5/1997 | Chang et al. |
| 5,630,126 A | 5/1997 | Redpath |
| 5,634,121 A | 5/1997 | Tracz et al. |
| 5,640,544 A | 6/1997 | Onodera et al. |
| 5,644,738 A | 7/1997 | Goldman et al. |
| 5,649,099 A | 7/1997 | Theimer et al. |
| 5,659,729 A | 8/1997 | Nielsen |
| 5,664,178 A | 9/1997 | Sinofsky |
| 5,668,966 A | 9/1997 | Ono et al. |
| 5,669,005 A | 9/1997 | Curbow et al. |
| 5,682,536 A | 10/1997 | Atkinson et al. |
| 5,689,667 A | 11/1997 | Kurtenbach |
| 5,689,703 A | 11/1997 | Atkinson et al. |
| 5,704,029 A | 12/1997 | Wright, Jr. |
| 5,706,501 A | 1/1998 | Horikiri et al. |
| 5,717,939 A | 2/1998 | Bricklin et al. |
| 5,721,824 A | 2/1998 | Taylor |
| 5,740,439 A | 4/1998 | Atkinson et al. |
| 5,742,504 A | 4/1998 | Meyer et al. |
| 5,745,683 A | 4/1998 | Lee et al. |
| 5,745,712 A | 4/1998 | Turpin et al. |
| 5,758,184 A | 5/1998 | Lucovsky et al. |
| 5,758,358 A | 5/1998 | Ebbo |
| 5,761,408 A | 6/1998 | Kolawa et al. |
| 5,761,683 A | 6/1998 | Logan et al. |
| 5,764,984 A | 6/1998 | Loucks |
| 5,764,985 A | 6/1998 | Smale |
| 5,778,372 A | 7/1998 | Cordell et al. |
| 5,778,402 A | 7/1998 | Gipson |
| 5,784,555 A | 7/1998 | Stone |
| 5,790,796 A | 8/1998 | Sadowsky |
| 5,798,757 A | 8/1998 | Smith |
| 5,801,701 A | 9/1998 | Koppolu et al. |
| 5,802,304 A | 9/1998 | Stone |
| 5,806,079 A | 9/1998 | Rivette et al. |
| 5,815,830 A | 9/1998 | Anthony |
| 5,826,265 A | 10/1998 | Van Huben et al. |
| 5,835,777 A | 11/1998 | Staelin |
| 5,838,906 A | 11/1998 | Doyle et al. |
| 5,842,018 A | 11/1998 | Atkinson et al. |
| 5,845,077 A | 12/1998 | Fawcett |
| 5,845,090 A | 12/1998 | Collins, III et al. |
| 5,854,630 A | 12/1998 | Nielsen |
| 5,859,973 A | 1/1999 | Carpenter et al. |
| 5,862,372 A | 1/1999 | Morris et al. |
| 5,864,819 A | 1/1999 | De Armas et al. |
| 5,907,704 A | 5/1999 | Gudmundson et al. |
| 5,910,895 A | 6/1999 | Proskauer et al. |
| 5,911,776 A | 6/1999 | Guck |
| 5,915,112 A | 6/1999 | Boutcher |
| 5,922,072 A | 7/1999 | Hutchinson et al. |
| 5,929,858 A | 7/1999 | Shibata et al. |
| 5,940,075 A | 8/1999 | Mutschler, III et al. |
| 5,950,010 A | 9/1999 | Hesse et al. |
| 5,956,481 A | 9/1999 | Walsh et al. |
| 5,960,199 A | 9/1999 | Brodsky et al. |
| 5,963,964 A | 10/1999 | Nielsen |
| 5,974,454 A | 10/1999 | Apfel et al. |
| 5,982,370 A | 11/1999 | Kamper |
| 5,987,480 A | 11/1999 | Donohue et al. |
| 5,991,710 A | 11/1999 | Papineni |
| 5,991,877 A | 11/1999 | Luckenbaugh |
| 5,995,103 A | 11/1999 | Ashe |
| 5,999,740 A | 12/1999 | Rowley |
| 6,005,570 A | 12/1999 | Gayraud et al. |
| 6,014,135 A | 1/2000 | Fernandes |
| 6,016,520 A | 1/2000 | Facq et al. |
| 6,018,743 A | 1/2000 | Xu |
| 6,026,379 A | 2/2000 | Haller et al. |
| 6,026,416 A | 2/2000 | Kanerva et al. |
| 6,031,989 A | 2/2000 | Cordell |
| 6,035,309 A | 3/2000 | Dauerer et al. |
| 6,044,205 A | 3/2000 | Reed et al. |
| 6,052,531 A | 4/2000 | Waldin et al. |
| 6,052,710 A | 4/2000 | Saliba et al. |
| 6,054,987 A | 4/2000 | Richardson |
| 6,072,870 A | 6/2000 | Nguyen et al. |
| 6,078,326 A | 6/2000 | Kilmer et al. |
| 6,078,327 A | 6/2000 | Liman et al. |
| 6,078,924 A | 6/2000 | Ainsbury et al. |
| 6,081,610 A | 6/2000 | Dwork et al. |
| 6,084,585 A | 7/2000 | Kraft et al. |
| 6,088,708 A | 7/2000 | Burch et al. |
| 6,091,417 A | 7/2000 | Lefkowitz |

| | | |
|---|---|---|
| 6,094,657 A | 7/2000 | Hailpern et al. |
| 6,098,081 A | 8/2000 | Heidorn et al. |
| 6,108,637 A | 8/2000 | Blumenau |
| 6,108,783 A | 8/2000 | Krawczyk et al. |
| 6,115,646 A | 9/2000 | Fiszman et al. |
| 6,121,965 A | 9/2000 | Kenney et al. |
| 6,122,647 A | 9/2000 | Horowitz |
| 6,144,969 A | 11/2000 | Inokuchi et al. |
| 6,151,624 A | 11/2000 | Teare et al. |
| 6,163,772 A | 12/2000 | Kramer et al. |
| 6,167,521 A | 12/2000 | Smith et al. |
| 6,167,523 A | 12/2000 | Strong |
| 6,182,095 B1 | 1/2001 | Leymaster et al. |
| 6,188,401 B1 | 2/2001 | Peyer |
| 6,191,797 B1 | 2/2001 | Politis |
| 6,192,367 B1 | 2/2001 | Hawley et al. |
| 6,195,661 B1 | 2/2001 | Filepp et al. |
| 6,199,204 B1 | 3/2001 | Donohue |
| 6,209,128 B1 | 3/2001 | Gerard et al. |
| 6,216,152 B1 | 4/2001 | Wong et al. |
| 6,219,698 B1 | 4/2001 | Iannucci et al. |
| 6,225,996 B1 | 5/2001 | Gibb et al. |
| 6,253,366 B1 | 6/2001 | Mutschler, III |
| 6,253,374 B1 | 6/2001 | Dresevic et al. |
| 6,263,313 B1 | 7/2001 | Milsted et al. |
| 6,266,810 B1 | 7/2001 | Tanaka et al. |
| 6,268,852 B1 | 7/2001 | Lindhorst et al. |
| 6,272,506 B1 | 8/2001 | Bell |
| 6,275,227 B1 | 8/2001 | DeStefano |
| 6,275,599 B1 | 8/2001 | Adler et al. |
| 6,282,711 B1 | 8/2001 | Halpern et al. |
| 6,286,033 B1 | 9/2001 | Kishinsky et al. |
| 6,292,897 B1 | 9/2001 | Gennaro et al. |
| 6,297,819 B1 | 10/2001 | Furst |
| 6,300,948 B1 | 10/2001 | Geller et al. |
| 6,308,179 B1 | 10/2001 | Petersen et al. |
| 6,311,271 B1 | 10/2001 | Gennaro et al. |
| 6,321,259 B1 | 11/2001 | Ouellette et al. |
| 6,321,334 B1 | 11/2001 | Jerger et al. |
| 6,327,628 B1 | 12/2001 | Anuff et al. |
| 6,331,864 B1 | 12/2001 | Coco et al. |
| 6,342,907 B1 | 1/2002 | Petty et al. |
| 6,343,302 B1 | 1/2002 | Graham |
| 6,345,256 B1 | 2/2002 | Milsted et al. |
| 6,345,278 B1 | 2/2002 | Hitchcock et al. |
| 6,345,361 B1 | 2/2002 | Jerger et al. |
| 6,347,323 B1 | 2/2002 | Garber et al. |
| 6,349,408 B1 | 2/2002 | Smith |
| 6,353,926 B1 | 3/2002 | Parthesarathy et al. |
| 6,357,038 B1 | 3/2002 | Scouten |
| 6,366,907 B1 | 4/2002 | Fanning et al. |
| 6,366,912 B1 | 4/2002 | Wallent et al. |
| 6,369,840 B1 | 4/2002 | Barnett et al. |
| 6,374,402 B1 | 4/2002 | Schmeidler et al. |
| 6,381,742 B2 | 4/2002 | Forbes et al. |
| 6,381,743 B1 | 4/2002 | Mutschler, III |
| 6,389,434 B1 | 5/2002 | Rivette |
| 6,393,456 B1 | 5/2002 | Ambler et al. |
| 6,396,488 B1 | 5/2002 | Simmons et al. |
| 6,408,311 B1 | 6/2002 | Baisley et al. |
| 6,414,700 B1 | 7/2002 | Kurtenbach et al. |
| 6,421,070 B1 | 7/2002 | Ramos et al. |
| 6,421,656 B1 | 7/2002 | Cheng et al. |
| 6,425,125 B1 | 7/2002 | Fries et al. |
| 6,429,885 B1 | 8/2002 | Saib et al. |
| 6,434,563 B1 | 8/2002 | Pasquali et al. |
| 6,434,564 B2 | 8/2002 | Ebert |
| 6,442,563 B1 | 8/2002 | Bacon et al. |
| 6,442,755 B1 | 8/2002 | Lemmons et al. |
| 6,446,110 B1 | 9/2002 | Lection et al. |
| 6,449,617 B1 | 9/2002 | Quinn et al. |
| 6,457,009 B1 | 9/2002 | Bollay |
| 6,460,058 B2 | 10/2002 | Koppulu |
| 6,463,419 B1 | 10/2002 | Kluss |
| 6,470,349 B1 | 10/2002 | Heninger |
| 6,473,800 B1 | 10/2002 | Jerger et al. |
| 6,476,828 B1 | 11/2002 | Burkett et al. |
| 6,476,833 B1 | 11/2002 | Moshfeghi |
| 6,477,544 B1 | 11/2002 | Bolosky |
| 6,487,566 B1 | 11/2002 | Sundaresan |
| 6,490,601 B1 | 12/2002 | Markus et al. |
| 6,493,702 B1 | 12/2002 | Adar et al. |
| 6,502,101 B1 | 12/2002 | Verprauskus et al. |
| 6,502,103 B1 | 12/2002 | Frey et al. |
| 6,505,230 B1 | 1/2003 | Mohan et al. |
| 6,505,300 B2 | 1/2003 | Chan et al. |
| 6,507,856 B1 | 1/2003 | Chen et al. |
| 6,516,322 B1 | 2/2003 | Meredith |
| 6,519,617 B1 | 2/2003 | Wanderski et al. |
| RE38,070 E | 4/2003 | Spies et al. |
| 6,546,546 B1 | 4/2003 | Van Doorn |
| 6,549,221 B1 | 4/2003 | Brown et al. |
| 6,549,878 B1 | 4/2003 | Lowry et al. |
| 6,549,922 B1 | 4/2003 | Srivastava et al. |
| 6,553,402 B1 | 4/2003 | Makarios et al. |
| 6,560,620 B1 | 5/2003 | Ching |
| 6,560,640 B2 | 5/2003 | Smethers |
| 6,563,514 B1 | 5/2003 | Samar |
| 6,571,253 B1 | 5/2003 | Thompson et al. |
| 6,578,144 B1 | 6/2003 | Gennaro et al. |
| 6,581,061 B2 | 6/2003 | Graham |
| 6,584,548 B1 | 6/2003 | Bourne et al. |
| 6,585,778 B1 | 7/2003 | Hind et al. |
| 6,589,290 B1 | 7/2003 | Maxwell et al. |
| 6,598,219 B1 | 7/2003 | Lau |
| 6,603,489 B1 | 8/2003 | Edlund et al. |
| 6,604,099 B1 | 8/2003 | Chung et al. |
| 6,606,606 B2 | 8/2003 | Starr |
| 6,609,200 B2 | 8/2003 | Anderson et al. |
| 6,611,822 B1 | 8/2003 | Beams et al. |
| 6,611,840 B1 | 8/2003 | Baer et al. |
| 6,613,098 B1 | 9/2003 | Sorge et al. |
| 6,615,276 B1 | 9/2003 | Mastrianni et al. |
| 6,629,109 B1 | 9/2003 | Koshisaka |
| 6,631,357 B1 | 10/2003 | Perkowski |
| 6,631,497 B1 | 10/2003 | Jamshidi et al. |
| 6,632,251 B1 | 10/2003 | Rutten et al. |
| 6,643,652 B2 | 11/2003 | Helgeson et al. |
| 6,643,684 B1 | 11/2003 | Malkin et al. |
| 6,651,217 B1 | 11/2003 | Kennedy et al. |
| 6,654,737 B1 | 11/2003 | Nunez |
| 6,654,932 B1 | 11/2003 | Bahrs et al. |
| 6,658,417 B1 | 12/2003 | Stakutis et al. |
| 6,658,622 B1 | 12/2003 | Aiken et al. |
| 6,668,369 B1 | 12/2003 | Krebs et al. |
| 6,675,202 B1 | 1/2004 | Perttunen |
| 6,678,717 B1 | 1/2004 | Schneider |
| 6,691,230 B1 | 2/2004 | Bardon |
| 6,691,281 B1 | 2/2004 | Sorge et al. |
| 6,697,944 B1 | 2/2004 | Jones et al. |
| 6,701,434 B1 | 3/2004 | Rohatgi |
| 6,701,486 B1 | 3/2004 | Weber et al. |
| 6,704,906 B1 | 3/2004 | Yankovich et al. |
| 6,711,679 B1 | 3/2004 | Guski et al. |
| 6,720,985 B1 | 4/2004 | Silverbrook et al. |
| 6,725,426 B1 | 4/2004 | Pavlov |
| 6,735,721 B1 | 5/2004 | Morrow et al. |
| 6,748,385 B1 | 6/2004 | Rodkin |
| 6,751,777 B2 | 6/2004 | Bates |
| 6,754,874 B1 | 6/2004 | Richman |
| 6,757,868 B1 | 6/2004 | Glaser et al. |
| 6,760,723 B2 | 7/2004 | Oshinsky et al. |
| 6,763,343 B1 | 7/2004 | Brooke et al. |
| 6,772,139 B1 | 8/2004 | Smith, III |
| 6,772,165 B2 | 8/2004 | O'Carroll |
| 6,774,926 B1 | 8/2004 | Ellis et al. |

| Patent/Publication | Date | Name |
|---|---|---|
| 6,781,609 B1 | 8/2004 | Barker et al. |
| 6,799,299 B1 | 9/2004 | Li et al. |
| 6,801,929 B1 | 10/2004 | Donoho et al. |
| 6,845,380 B2 | 1/2005 | Su et al. |
| 6,847,387 B2 | 1/2005 | Roth |
| 6,848,078 B1 | 1/2005 | Birsan et al. |
| 6,871,220 B1 | 3/2005 | Rajan et al. |
| 6,874,130 B1 | 3/2005 | Baweja et al. |
| 6,901,403 B1 | 5/2005 | Bata et al. |
| 6,915,454 B1 | 7/2005 | Moore et al. |
| 6,931,532 B1 | 8/2005 | Davis et al. |
| 6,941,511 B1 | 9/2005 | Hind et al. |
| 6,941,521 B2 | 9/2005 | Lin et al. |
| 6,948,135 B1 | 9/2005 | Ruthfield et al. |
| 6,950,980 B1 | 9/2005 | Malcolm |
| 6,961,897 B1 | 11/2005 | Peel, Jr. et al. |
| 6,963,875 B2 | 11/2005 | Moore |
| 6,968,503 B1 | 11/2005 | Chang et al. |
| 6,968,505 B2 | 11/2005 | Stoll et al. |
| 6,993,714 B2 | 1/2006 | Kaler et al. |
| 6,996,776 B1 | 2/2006 | Makely et al. |
| 7,024,417 B1 | 4/2006 | Russakovsky et al. |
| 7,032,170 B2 | 4/2006 | Poulose |
| 7,036,072 B1 | 4/2006 | Sulistio et al. |
| 7,039,875 B2 | 5/2006 | Khalfay et al. |
| 7,051,273 B1 | 5/2006 | Holt et al. |
| 7,058,663 B2 | 6/2006 | Johnston et al. |
| 7,062,764 B2 | 6/2006 | Cohen et al. |
| 7,065,493 B1 | 6/2006 | Homsi |
| 7,080,325 B2 | 7/2006 | Treibach-Heck et al. |
| 7,086,009 B2 | 8/2006 | Resnick et al. |
| 7,088,374 B2 | 8/2006 | David et al. |
| 7,103,611 B2 | 9/2006 | Murthy et al. |
| 7,106,888 B1 | 9/2006 | Silverbrook et al. |
| 7,107,282 B1 | 9/2006 | Yalamanchi |
| 7,107,521 B2 | 9/2006 | Santos |
| 7,152,205 B2 | 12/2006 | Day et al. |
| 7,190,376 B1 | 3/2007 | Tonisson |
| 7,191,394 B1 | 3/2007 | Ardeleanu et al. |
| 2001/0007109 A1 | 7/2001 | Lange |
| 2001/0024195 A1 | 9/2001 | Hayakawa |
| 2001/0054004 A1 | 12/2001 | Powers |
| 2001/0056429 A1 | 12/2001 | Moore |
| 2001/0056460 A1 | 12/2001 | Sahota et al. |
| 2002/0010743 A1 | 1/2002 | Ryan et al. |
| 2002/0010746 A1 | 1/2002 | Jilk et al. |
| 2002/0013788 A1 | 1/2002 | Pennell et al. |
| 2002/0026441 A1 | 2/2002 | Kutay |
| 2002/0026461 A1 | 2/2002 | Kutay et al. |
| 2002/0032590 A1 | 3/2002 | Anand et al. |
| 2002/0032692 A1 | 3/2002 | Suzuki et al. |
| 2002/0032706 A1 | 3/2002 | Perla et al. |
| 2002/0032768 A1 | 3/2002 | Voskuil |
| 2002/0035579 A1 | 3/2002 | Wang et al. |
| 2002/0057297 A1 | 5/2002 | Grimes et al. |
| 2002/0065798 A1 | 5/2002 | Bostleman et al. |
| 2002/0070973 A1 | 6/2002 | Croley |
| 2002/0078074 A1 | 6/2002 | Cho et al. |
| 2002/0078103 A1 | 6/2002 | Gorman et al. |
| 2002/0129056 A1 | 9/2002 | Conant |
| 2002/0152244 A1 | 10/2002 | Dean et al. |
| 2002/0156846 A1 | 10/2002 | Rawat et al. |
| 2002/0169752 A1 | 11/2002 | Kusama et al. |
| 2002/0169789 A1 | 11/2002 | Kutay |
| 2002/0174147 A1 | 11/2002 | Wang et al. |
| 2002/0174417 A1 | 11/2002 | Sijacic et al. |
| 2002/0188597 A1 | 12/2002 | Kern et al. |
| 2002/0188613 A1 | 12/2002 | Chakraborty et al. |
| 2002/0194219 A1 | 12/2002 | Bradley et al. |
| 2002/0196281 A1 | 12/2002 | Audleman et al. |
| 2002/0196288 A1 | 12/2002 | Emrani |
| 2003/0004951 A1 | 1/2003 | Chokshi |
| 2003/0020746 A1 | 1/2003 | Chen et al. |
| 2003/0023641 A1 | 1/2003 | Gorman et al. |
| 2003/0025732 A1 | 2/2003 | Prichard |
| 2003/0037303 A1 | 2/2003 | Bodlaender |
| 2003/0048301 A1 | 3/2003 | Menninger |
| 2003/0051243 A1 | 3/2003 | Lemmons et al. |
| 2003/0055811 A1 | 3/2003 | Stork et al. |
| 2003/0055828 A1 | 3/2003 | Koch et al. |
| 2003/0061567 A1 | 3/2003 | Brown et al. |
| 2003/0084424 A1 | 5/2003 | Reddy et al. |
| 2003/0120578 A1 | 6/2003 | Newman |
| 2003/0120651 A1 | 6/2003 | Bernstein et al. |
| 2003/0120659 A1 | 6/2003 | Sridhar |
| 2003/0120671 A1 | 6/2003 | Kim et al. |
| 2003/0126555 A1 | 7/2003 | Aggarwal et al. |
| 2003/0128196 A1 | 7/2003 | Lapstun et al. |
| 2003/0135825 A1 | 7/2003 | Gertner et al. |
| 2003/0140132 A1 | 7/2003 | Champagne et al. |
| 2003/0158897 A1 | 8/2003 | Ben-Natan |
| 2003/0182327 A1 | 9/2003 | Ramanujam et al. |
| 2003/0187756 A1 | 10/2003 | Klivington et al. |
| 2003/0188260 A1 | 10/2003 | Jensen et al. |
| 2003/0189593 A1 | 10/2003 | Yarvin |
| 2003/0192008 A1 | 10/2003 | Lee |
| 2003/0204814 A1 | 10/2003 | Elo et al. |
| 2003/0212664 A1 | 11/2003 | Breining et al. |
| 2003/0217053 A1 | 11/2003 | Bachman et al. |
| 2003/0225469 A1 | 12/2003 | DeRemer et al. |
| 2003/0225829 A1 | 12/2003 | Pena et al. |
| 2003/0233374 A1 | 12/2003 | Spinola et al. |
| 2003/0236859 A1* | 12/2003 | Vaschillo et al. ............ 709/218 |
| 2003/0237046 A1* | 12/2003 | Parker et al. ................ 715/513 |
| 2003/0237047 A1 | 12/2003 | Borson |
| 2004/0003031 A1 | 1/2004 | Brown et al. |
| 2004/0003353 A1 | 1/2004 | Rivera et al. |
| 2004/0003389 A1 | 1/2004 | Reynar et al. |
| 2004/0010752 A1 | 1/2004 | Chan et al. |
| 2004/0024842 A1 | 2/2004 | Witt |
| 2004/0030991 A1 | 2/2004 | Hepworth et al. |
| 2004/0039990 A1 | 2/2004 | Bakar et al. |
| 2004/0039993 A1 | 2/2004 | Kougiouris et al. |
| 2004/0044961 A1 | 3/2004 | Pesenson |
| 2004/0044965 A1 | 3/2004 | Toyama et al. |
| 2004/0054966 A1 | 3/2004 | Busch et al. |
| 2004/0059754 A1 | 3/2004 | Barghout et al. |
| 2004/0073868 A1 | 4/2004 | Easter et al. |
| 2004/0078756 A1 | 4/2004 | Napper et al. |
| 2004/0083426 A1 | 4/2004 | Sahu |
| 2004/0088647 A1 | 5/2004 | Miller et al. |
| 2004/0093596 A1 | 5/2004 | Koyano |
| 2004/0107367 A1 | 6/2004 | Kisters |
| 2004/0117769 A1 | 6/2004 | Lauzon et al. |
| 2004/0123277 A1 | 6/2004 | Schrader et al. |
| 2004/0172442 A1 | 9/2004 | Ripley |
| 2004/0189716 A1 | 9/2004 | Paoli et al. |
| 2004/0194035 A1 | 9/2004 | Chakraborty |
| 2004/0205473 A1 | 10/2004 | Fisher et al. |
| 2004/0205525 A1 | 10/2004 | Murren et al. |
| 2004/0205534 A1 | 10/2004 | Koelle |
| 2004/0205571 A1 | 10/2004 | Adler |
| 2004/0205653 A1* | 10/2004 | Hadfield et al. ............. 715/530 |
| 2004/0205671 A1 | 10/2004 | Sukehiro et al. |
| 2004/0221238 A1 | 11/2004 | Cifra et al. |
| 2004/0237030 A1 | 11/2004 | Malkin |
| 2004/0268229 A1 | 12/2004 | Paoli et al. |
| 2005/0004893 A1 | 1/2005 | Sangroniz |
| 2005/0005248 A1 | 1/2005 | Rockey et al. |
| 2005/0015732 A1 | 1/2005 | Vedula et al. |
| 2005/0027757 A1 | 2/2005 | Kiessig et al. |
| 2005/0038711 A1 | 2/2005 | Marlelo |
| 2005/0055627 A1 | 3/2005 | Lloyd et al. |
| 2005/0060324 A1 | 3/2005 | Johnson et al. |
| 2005/0065933 A1 | 3/2005 | Goering |
| 2005/0065936 A1 | 3/2005 | Goering |

| | | | |
|---|---|---|---|
| 2005/0066287 A1 | 3/2005 | Tattrie et al. | |
| 2005/0071752 A1 | 3/2005 | Marlatt | |
| 2005/0076049 A1 | 4/2005 | Qubti et al. | |
| 2005/0091285 A1 | 4/2005 | Krishnan et al. | |
| 2005/0091305 A1 | 4/2005 | Lange et al. | |
| 2005/0102370 A1 | 5/2005 | Lin et al. | |
| 2005/0102612 A1 | 5/2005 | Allan et al. | |
| 2005/0108104 A1 | 5/2005 | Woo | |
| 2005/0108624 A1 | 5/2005 | Carrier | |
| 2005/0114757 A1 | 5/2005 | Sahota et al. | |
| 2005/0138086 A1 | 6/2005 | Pecht-Seibert | |
| 2005/0198086 A1 | 9/2005 | Moore | |
| 2005/0198247 A1 | 9/2005 | Perry et al. | |
| 2005/0223063 A1 | 10/2005 | Chang et al. | |
| 2005/0268222 A1 | 12/2005 | Cheng | |
| 2006/0020586 A1 | 1/2006 | Prompt et al. | |
| 2006/0026534 A1 | 2/2006 | Ruthfield et al. | |
| 2006/0031757 A9 | 2/2006 | Vincent, III | |
| 2006/0041838 A1 | 2/2006 | Khan | |
| 2006/0059434 A1 | 3/2006 | Boss et al. | |
| 2006/0069605 A1 | 3/2006 | Hatoun | |
| 2006/0085409 A1 | 4/2006 | Rys et al. | |
| 2006/0143220 A1 | 6/2006 | Spencer, Jr. | |
| 2007/0036433 A1 | 2/2007 | Teutsch | |
| 2007/0050719 A1 | 3/2007 | Lui et al. | |
| 2007/0061467 A1 | 3/2007 | Essey | |
| 2007/0061706 A1 | 3/2007 | Cupala | |
| 2007/0074106 A1 | 3/2007 | Ardeleanu | |
| 2007/0094589 A1 | 4/2007 | Paoli | |
| 2007/0100877 A1 | 5/2007 | Paoli | |
| 2007/0101280 A1 | 5/2007 | Paoli | |

FOREIGN PATENT DOCUMENTS

| | | |
|---|---|---|
| EP | 0961197 | 12/1999 |
| EP | 1076290 | 2/2001 |
| EP | 1221661 | 7/2002 |
| JP | 63085960 | 4/1988 |
| JP | 401173140 | 7/1989 |
| JP | 4225466 | 8/1992 |
| JP | 5314152 | 11/1993 |
| JP | 406014105 | 1/1994 |
| JP | 6139241 | 5/1994 |
| JP | 6180697 | 6/1994 |
| JP | 6180698 | 6/1994 |
| JP | 3191429 | 1/2000 |
| JP | 2000132436 | 5/2000 |
| JP | 2002183652 | 6/2002 |
| JP | 2003173288 | 6/2003 |
| WO | WO 99/24945 | 5/1999 |
| WO | WO 99/56207 | 11/1999 |
| WO | WO 01/44934 | 6/2001 |
| WO | WO0157720 | 9/2006 |

OTHER PUBLICATIONS

Laura Acklen & Read Gilgen, "Using corel Wordperfect 9", 251-284, 424-434, 583-586 (1998).
Leblond et al, "PC Magazine Guide to Quattro Pro for Windows", pp. 9-11, 42-61, Ziff-Davis Press, Copyright 1993 by the LeBlond Group.
Microsoft Visual Basic 5.0 Programmer's Guide 1997; pp. 578-579;Redmond WA 98052-6399.
Excel 97 for Busy People Published by Osborne/Mcgraw-Hill 1997 pp. 48-50.
"A tour of Xmetal" O'Reilly XML.COM 'Online Jul. 14, 1999 XP002230081 retrieved from the Internet: <URL:http://www.xml.com/pub/a/SeyboldReport/ip0311025.html> retrieved on Feb. 5, 2003.
"Architecture for a Dynamic Information Area Control" IBM Technical Disclosure Bulletin IBM Corp. New York US vol. 37 No. 10 Jan. 10, 1994. pp. 245-246.
"Netscape Communicator's Collapsible Toolbars" CHI'98 Human Factors in Computing Systems Conference Proceedings Los Angeles CA Apr. 18-23, 1998 pp. 81-86.
Barker et al., "Creating In-Line Objects Within An Integrated Editing Environment," IBM Technical Disclosure Bulletin, vol. 27, No. 5, Oct. 1984, p. 2962.
"Flexible Information Presentation with XML" 1998 The Institution of Electrical Engineers 6 pages.
Berg A., "Naming and Binding: Monikers" Inside OLE, 1995, Chapter 9, pp. 431-490.
"Arbortext Adept 8 Editor Review" O'Reilly XML.COM 'Online! Sep. 22, 1999 XP002230080 retrieved from the Internet <URL:http://www.xml.com/pub/a/1999/09/adept/AdeptRvw.htm> retrieved on Feb. 5, 2003.
"XKvalidator: A Constraint Validator for XML" CIKM '-2 Nov. 4-9, 2002 Copyright 2002 ACM 1-58113-492-4/02/0011 pp. 446-452.
"Designing Valid XML Views" ER 2002 LNCS 2503 2002 Springer-Verlag Berlin Heidelberg 2002 pp. 463-477.
Efficient Management of Multiversion Documents by Object Referencing Proceedings of the 27th VLDB Conference 2001 pp. 291-300.
"Efficient schemes for managing mulitversion XML documents" VLDB Journal (2002) pp. 332-352.
"Storing and Querying Multiversion XML Documents using Durable Node Numbers" IEEE 2002 pp. 232-241.
"XML Document Versioning" SIGMOD Record vol. 30 No. 3 Sep. 2001 pp. 46-53.
"Generic Validation of Structural Content with Parametric Modules" ICFP '01 Sep. 3-5, 2001 Copyright 2001 ACM 1-58113-415-0/01/0009 pp. 98-109.
"Managing Complex Documents Over the WWW: A Case Study for XML" IEEE Transactions on Knowledge and Data Engineering vol. 11 No. 4 Jul./Aug. 1999. pp. 629-938.
Clapp D., "The NeXT Application Kit Part I: Non-Responsive Classes," The NeXT Bible 1990, Chapter 16, pp. 275-293.
Clark James—W3C Editor; "XSL Transformation (XSLT) Verison 1.0" Nov. 16, 1999 W3C (MIT INRIA Kejo) pp. 1-156.
W3C Editor James Clark and Ste; "XML Path Language (XPath) Version 1.0" Nov. 16, 1999 W3C (MIT INRIA Kejo) pp. 1-49.
"From small beginnings" Knowledge Management Nov. 2001 pp. 28-30.
"XML Editors: Allegations of Functionality in search of reality" INTERNET 'Online ! 1999 XP002230082 retrieved from the Internet <URL:http://www.ivritype.com/xml/>.
"Photo Shop 5/5.5 WOW! Book" 2000 Peachpit Press pp. 8-17.
Description of Whitehill Composer software product producted by Whitehill Technologies Inc. available at <http://www.xml.com/pub/p/221> accessed on Apr. 8, 2004, two pages.
DiLascia et al., "Sweeper" Microsoft Interactive Developer, vol. 1, No. 1, 1996, 27 pages.
"XML Spy Tops as XML Editor" http://www.eweek.com/article2/0395972404100.asp Nov. 25, 2002 4 pages.
"Agent-based Software Configuration and Deployment" Thesis of the University of Colorado Online Dec. 31, 1999 retrieved from the Internet on Nov. 7, 2003: <http://www.cs.colorado.edu/users/rickhall/documents/ThesisFinal.pdf> 169 pages.
"Mapping and Displaying Structural Transformations between XML and PDF" DocEng '02 Nov. 8-9, 2002 Copyright 2002 ACM 1-58113-597-7/02/0011 pp. 95-102.
"Tsbiff—tildeslash biff—version 1.2.1" INTERNET DOCUMENT [Online] Jun. 1999 URL:http://web.archive.org/web/19990912001527/http://www.tildeslash.com/tsbiff/.
Herzner et al., "CDAM- Compound Document Access and Management. An Object-Oriented Approach" Multimedia Systems Interaction and Applications, 1992, Chapter 3, pp. 17-36.
"Micro-Firewalls for Dynamic Network Security with Distributed Intrusion Detection"; IEEE INternational Symposium on Network Computing and Applications; 2001; pp 68-79.
"Specifying Runtime Environments and Functionalities of Downloadable Components Under the Sandbox Mode"; International Symposium on Principles of Software Evolution; 2000; pp. 138-142.

"An Efficiently Updatable Index Scheme for Structured Documents" 1998 IEEE pp. 991-996.

"Immediate and Partial Validation Mechanism for the Conflict Resolution of Update Operations in XML Databases" WAIM 2002 LNCS 2419 2002 pp. 387-396 Springer-Veriag Berlin Heidelberg 2002.

Kobayashi et al., "An Update on BTRON-specification OS Development" IEEE 1991, pp. 132-140.

Komatsu N. et al., "A Proposal on Digital Watermark in Document Image Communication and Its Application to Realizing a Signature" Electronics and Communications in Japan Part I: Communications vol. 73, No. 5, May 1990, pp. 22-33.

McCright J.S.; "New Tool Kit to Link Groove with Microsoft Sharepoint" eWeek Enterprise News & Reviews Ziff Davis Media Inc. Jul. 29, 2002.

Musgrave S; "Networking technology—impact and opportunities" Survey and Statistical Computing 1996. Proceedings of the Second ASC International Conference, Sep. 1996. pp. 369-378. London UK.

"Validation with MSXML and XML Schema" Windows Developer Magazine Jan. 2002 pp. 35-38.

"SmartUpdate Developer's Guide" Online Mar. 11, 1999 retrieved from the internet on Dec. 8, 2000: <http://developer.netscape.com:80/docs/manuals/communicator/jarman/index.htm> 83 pages.

"Netscape Communicator 4.61 for OS/2 Warp" Software 1999 The whole software release & "Netscape—Version 4.6 (en)-010615" NETSCAPE SCREENHOT Oct. 2, 2002 (Oct. 10, 2002).

"A secure conditional access system using digital signature and encryption" 2003 Digest of Technical Papers. International Conference on Consumer Electronics Jun. 2003 pp. 220-221.

Object Management Group, XML Metadata Interchange (XMI) Specification Version 1.2 Jan. 2002.

"Delphi 5 Developer's Guide" Sams Publishing 1999 Chapter 31 Section: Data Streaming 6 pages.

Peterson B., "Unix Variants," Unix Review, vol. 10, No. 4, Apr. 1992, pp. 29-31.

Pike et al., "Plan 9 from Bell Labs" UKUUG, Summer 1990, 10 pages.

Pike et al., "The Use of Name Spaces in Plan 9," Operating Systems Review vol. 27, No. 2, Apr. 1993, pp. 72-76.

Prevelakis et al., "Sandboxing Applications"; Proceedings of the FREENIX Track; 2001; pp. 119-126.

Rapaport L: "Get more from SharePoint" Transform Magazine vol. 11 No. 3. Mar. 2002 pp. 1315.

"Validating MPEG-21 Encapsulated Functional Metadata" IEEE 2002 pp. 209-212.

Schmid et al., "Protecting Data from Malicious Software"; 18th Annual Computer Security Applications Conference; 2002; pp. 199-208.

Staneck W., "Internal and External Media" Electronic Publishing Unleashed, 1995, Chapter 22, pp. 510-542.

"Store and Organize Related Project Files in a Binder," Getting Results with Microsoft Office, 1990, pp. 109-112.

Sun Q. et al., "A robust and secure media signature scheme for JPEG images" Proceedings of 2002 IEEE Workshop on Multimedia Signal Processing, Dec. 2002, pp. 296-299.

"XFIG Version 3.2 Patchlevel 2 (Jul. 2, 1998) Users Manual (Edition 1.0)" INTERNET DOCUMENT [Online] Jul. 2, 1998 XP002229137 Retrieved from the Internet: <URL:http://www.ice.mtu.edu/online_docs/xfig332/> [retrieved on Jan. 28, 2003].

"An Efficient and Flexible Access Control Framework for Java Programs in Mobile Terminals"; 22nd International Conference on Distributed Computing Systems Workshops; 2002; pp. 777-782.

Trupin J., "The Visual Programmer," Microsoft Systems Journal, Apr. 1996, pp. 103-105.

"XML: Not a Silver Bullet But a Great Pipe Wrench" Standardview vol. 6. No. 3 Sep. 1998 pp. 125-132.

"The Open Software Description Format" Online Aug. 13, 1997 retrieved from the Internet on Nov. 7, 2003: <http://www.w3.org/TR/NOTE-OSD> 11 pages.

"Bridging XML-Schema and relational databases. A System for generating and manipulating relational databases using valid XML documents." DocEng '01 Nov. 9-10, 2001 Coppyright 2001 ACM 1-58113-432-0/01/0011 pp. 105-114.

"The Component Object Model" "A Technical Overview" Oct. 1994 Microsoft Corp. pp. 1-14.

"Managing and Querying Multi-Version XML Data with Update Logging" DocEng '02 Nov. 8-9, 2002 Copyright 2002 ACM 1-58113-594-7/02/0011 pp. 74-81.

Zdonik S., "Object Management System Concepts," ACM, 1984, pp. 13-19.

Han et al., WebSplitter: A Unified XML Framework for Multi-Device Collaborative Web Browsing, 2000, ACM Conference on Cimputer Supported Cooperative Work, 10 pages.

IBM: Stack Algorithm for Extractin Subtree from Serialized Tree, Mar. 1, 1994, TDB-ACC-NONN94033, 3 pages.

Alova, "User Reference manual Version 4.4, XML Spy suite 4.4," Alova Ges.m.g.H & Altova, Inc., May 24, 2002, pages cover, copyright page, 1-565.

Altova et al. XML Spy, XML Integrated Development Environments, Altova Inc., 2002, pp. 1-18.

Ben-Natah, U.S. Appl. No. 60/203,081, filed May 9, 2000, entitled "Internet platform for creating and supporting communities".

Ixia Soft, "Steamlining content creation, retrieval, and publishing on the Web using TEXTML Server and SML Spy 4 Suite in an integrated. Web publishing environment," (Partner's Whitepaper, published on the Web as of Jun. 6, 2002, downlowad pp. 1-16.

Kutay, U.S. Appl. No. 60/209,713, filed Jun. 5, 2000, entitled, "Methods and systems for accessing, organizing presenting and viewing data".

Microsoft Word 2000 (see Screen Shot "About Microsoft Word") Published 1983-1999 and Microsoft Excel 2000 (see Screen Shot "About Microsoft Excel") Published 1988-1999, Three pages.

Moore, U.S. Appl. No. 60/191,662, filed Mar. 23, 2000, entitled "Collection-based presistent digital archives".

Altova et al. XML Spy, XML integrated Development Environments, Altova Inc., 2002, pp. 1-18.

Cybook, Inc.: "Copying the Search Form to Services-based Web Sites" INternet Article, (online) Jul. 26, 2004. the whole document.

Excel Developer Tip (hereinafter "Excel"), "Determining the Data Type of a Cell", May 13, 1998, p. 1 (available at http://jwalk.com/ss//excel/tips/tip62.htm).

Rado, Dave: "How to create a template that makes it easy for users to "fill in the blanks", without doing any programming" Microsoft Word MVP FAQ Site, (online) Apr. 30, 2004, the whole document.

Anat, Eyal et al., "Integrating and Customizing Hererogeneous E-Commerce Applications", The VLDB Journal-The International Journal on Very Large Data Bases, vol.10, Issue 1,(Aug. 2001),16-38.

Adams, Susie et al., "BizTalk Unleashed", Sams publishing, 2002, first printing Mar. 2001,1-2, 31-138.

Vasters, Clemens F., "BizTalk Server 2000 A Beginner's Guide", Osborne/McGraw-Hill,(2001), 1-2, 359-402.

Halberg, Bruce et al., "Using Microsoft Excel 97", (1997),191-201, 213-219.

Villard, et al., "An Incremental XSLT Transformation Processor for XML Document Manipulation", http://www2002.org/CDROM/refereed/321, Printed on May 18, 2007,(May 2002),25 pages.

"Enter Key", Retrieved from the Internet at http://systems.webopedia.com/TERM/Enter_key.html on Dec. 20, 2006.

"Microsoft Visual Basic 5.0 Programmer's Guide", *Microsoft Press*, (1997),pp. 42-43, 54-58.

"Microsoft Word 2000", Screenshots,(1999),1-5.

Beauchemin, Dave , "Using InfoPath to Create Smart Forms", Retrieved from the Internet at http://www.microsoft.com/office/infopath/prodinfo/using.mspx on Jan. 21, 2007,(Mar. 27, 2003).

Begun, Andrew , et al., "Support and Troubleshooting for XML Schemas in InfoPath 2003", *Microsoft Office InfoPath 2003 Technical Articles*, Retrieved from the Internet at http://msdn2.microsoft.com/en-us/library/aa168241(office,11,d=printer).aspx on Jan. 21, 2007,(Aug. 2004).

Borland, Russo , "Running Microsoft Word 97", 314-315, 338, 361-362, 390, and 714-719.

Brabrand, et al., "Power Forms Declarative Client-side Form Field Validation", (2002),1-20.

Dubinko, Micah, "XForms and Microsoft InfoPath", Retrieved from the Internet at http://www.xml.com/lpt/a/1311 on Jan. 21, 2007,(Oct. 29, 2003).

Hoffman, Michael, "Architecture of Microsoft Office InfoPath 2003", *Microsoft Office InfoPath 2003 Technical Articles*, Retrieved from the Internet at http://msdn2.microsoft.com/en-us/library/aa219024(office.11,d=printer).aspx on Jan. 21, 2007,(Jun. 2003).

Lehtonen, Miro, et al., "A Dynamic User Interface for Document Assembly", Department of Computer Science, University of Helsinki,(Nov. 2002).

Nelson, Joe, "Client-side Form Validation Using JavaScript", *Developer Advisory*, (Sep. 21, 2001).

Raman, T. V., et al., "XForms 1.0", (Dec. 2001),Section 1-12.2.3 & Appendices A-G.

Rees, Michael J., "Evolving the Browser Towards a Standard User Interface Architecture", School of Information Technology, Bond Univeristy, Australia,(2001).

Singh, Darshan, "Microsoft InfoPath 2003 By Example", Retrieved from the Internet at http://www.perfectxml.com/InfoPath.asp on Jan. 21, 2007,(Apr. 20, 2003).

Udell, Jon, "InfoPath and XForms", Retrieved from the Internet at http://weblog.infoworld.com/udell/2003/02/26.html,(Feb. 26, 2003).

Grosso, et al., "XML Fragment Interchange", W3C,(Feb. 2001), 1-28.

Altova, et al., "User and Reference Manual Version 4.4", www.xmlspy.com, (May 24, 2007), 1-565.

"XForm 1.0", W3C,(Jul.16, 2001).

* cited by examiner

US 7,318,063 B2

MANAGING XML DOCUMENTS CONTAINING HIERARCHICAL DATABASE INFORMATION

TECHNICAL FIELD

The described subject matter relates to computing, and more particularly to managing XML documents containing hierarchical database information.

BACKGROUND

Extensible markup language (XML) is increasingly becoming the preferred format for transferring data. XML is a tag-based hierarchical language that provides the ability to represent data in diverse formats and contexts. For example, XML can be used to represent data spanning the spectrum from semi-structured data (such as one would find in a word-processing document) to generally structured data. XML is well-suited for many types of communication including business-to-business and client-to-server communication.

Data represented in XML is often created and retained in electronic documents, such as electronic forms. The structure of an electronic form that is written in XML typically is governed by an XML schema (XSD) and this structure can be altered by applying an eXtensible Style-sheet Language Transformation (XSLT) file on the form. For more information on XML, XSLT, and XSD (schemas), the reader is referred to the following documents which are the work of, and available from the W3C (World Wide Web consortium): XML Schema Part 2: Datatypes; XML Schema Part 1: Structures; and XSL Transformations (XSLT) Version 1.0; and XML 1.0 Second Edition Specification.

Databases are computerized information storage and retrieval systems. A Relational Database Management System (RDBMS) is a database management system (DBMS) which uses relational techniques for storing and retrieving data. RDBMS software using a Structured Query Language (SQL) interface is well known in the art. The SQL interface has evolved into a standard language for RDBMS software and has been adopted as such by both the American National Standards Organization (ANSI) and the International Standards Organization (ISO). The information stored in a RDBMS is typically hierarchical in nature. Parent-child relationships are defined through integrity constraints across multiple relational tables. But it frequently makes sense to present this information to humans (or other applications) as hierarchical information, which can be done using XML.

When hierarchical database information is persisted as a structured XML document, a unique set of challenges are created in translating the changes to the XML document back into the database. For example, while XML data is by nature hierarchical, typically the only relationship between a parent and a child is the fact that the child is contained within the parent. By contrast, in a database both parent and child will contain common data kept in sync through referential integrity.

When XML is used as a temporary persistence format for data retrieved from a hierarchical database to be consumed by a wide variety of applications (e.g., web services, internet application, thin client applications), it is important that the retrieved information can be returned to its original storage format (e.g., a database) properly reflecting the changes made by the application(s) that manipulated the data.

SUMMARY

Described herein are systems and methods for managing XML documents containing hierarchical database information. The systems and methods permit hierarchical database information to be downloaded into an XML document for presentation to a user, or to an application, for editing. Changes to the data made during the editing process are tracked, and the data may be uploaded back to the database.

DETAILED DESCRIPTION

The subject matter described herein facilitates management of data that is stored in a hierarchical format such as, e.g., a relational database, when the data is retrieved and manipulated using a schema-driven format such as, e.g., XML. In one implementation this is accomplished by generating a non-editable copy of the XML data retrieved from the database and annotating each logical unit in the original XML data or the copy of the XML data in a manner that uniquely identifies each logical unit and relates it to its corresponding item in the generated copy. For example, each XML node may be assigned a unique numerical or string identifier or a value representing the items original ordinal position. As the data is manipulated, algorithms may be implemented to use the annotations to track changes to the XML data and to ensure that the manipulated XML data complies with one or more required data formats. When the XML data is ready to be transferred back to the database(s) from which it was obtained, a series of operations are implemented to validate the data and to determine the nature of operation to be performed to restore the data to the database(s).

This document provides a description of representing XML data retrieved from a hierarchical data source such as, e.g., a database. This document further provides a description of a computer-based system for managing XML documents containing hierarchical database information, exemplary methods performed by such a system, and an exemplary computer on which the system may be implemented. The methods described herein may be embodied as logic instructions on a computer-readable medium implemented in any suitable software or firmware, or may be reduced to hardware. When executed on a processor, the logic instructions cause a general purpose computing device to be programmed as a special-purpose machine that implements the described methods. The processor, when configured by the logic instructions to execute the methods recited herein, constitutes structure for performing the described methods.

Representation of Hierarchical Data Using XML

Figure 1A:
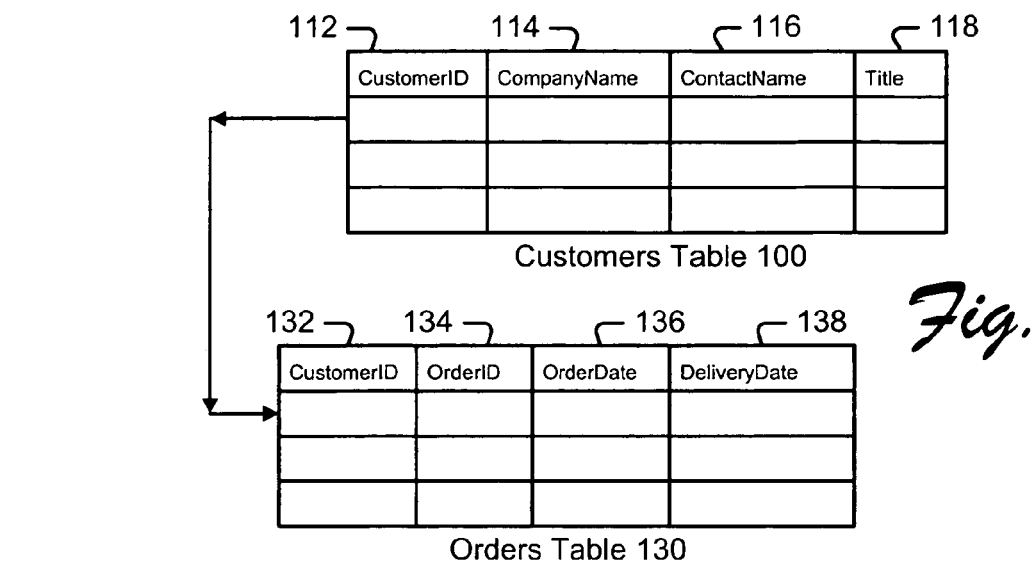
FIGS. 1A-1B are schematic illustrations of a mapping between hierarchical data such as, e.g., data stored in a relation database and an XML schema.
Figure 1B:
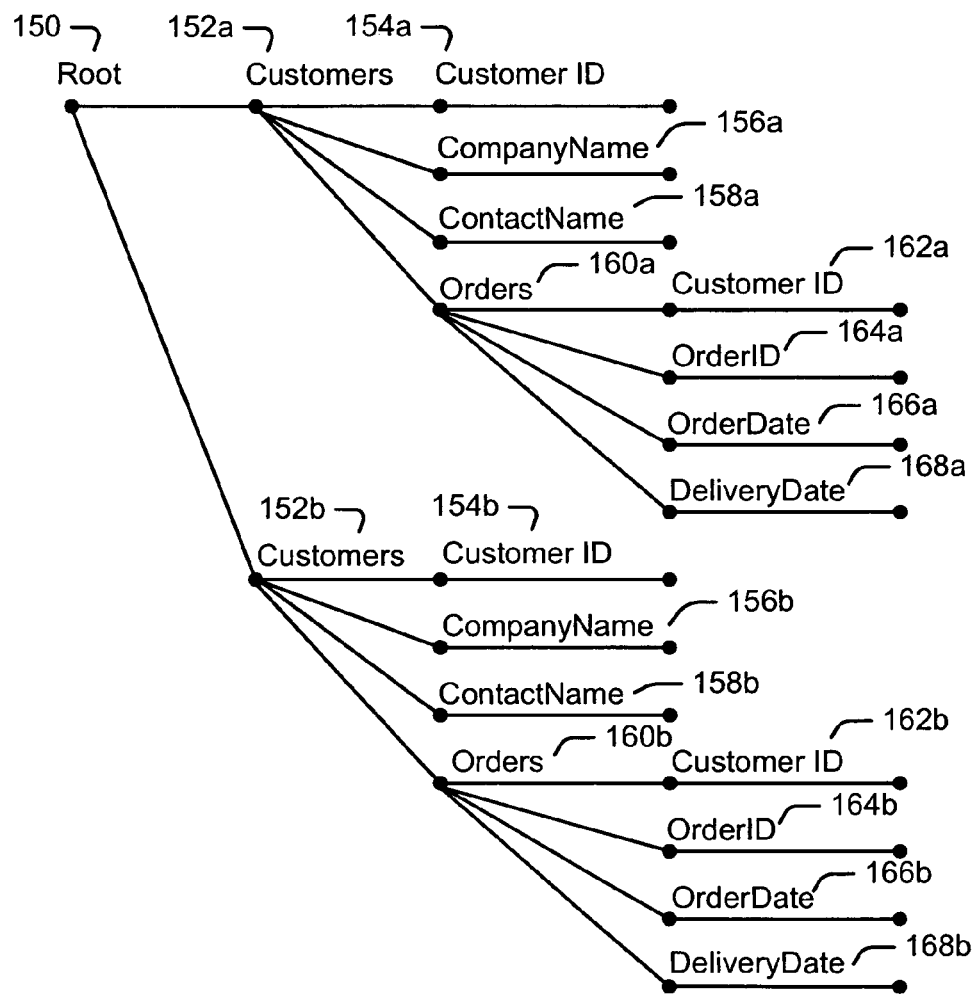

FIGS. 1A-1B are schematic illustrations of the mapping between hierarchical data such as, e.g., data stored in a relation database and an XML schema. Referring to FIG. 1A, a conventional relational database may be considered to store data in the form of one or more tables such as customers table 100 and orders table 130. Customers table 100 may include a plurality of fields represented as columns such as, e.g., CustomerID 112, CompanyName 114, ContactName 116, and Title 118. Similarly, orders table 130 may include a plurality of fields represented as columns such as, e.g., CustomerID 132, OrderID 134, OrderDate 136, and DeliveryDate 138. Customers table 100 and orders table 130 may be related by two or more fields (i.e., one in each table). In FIG. 1, customers table 100 and orders table 130 are related by CustomerID field 112 and CustomerID field 132.

Relational data from may be extracted or viewed by way of a hierarchical self-describing format such as extensible markup language (XML). For example, SQL Server 2000 developed by MICROSOFT CORPORATION provides extensive database programming capabilities built on Web standards. XML and Internet standard support in that product provides the ability to store and retrieve data in XML format easily with built-in stored procedures. The data extracted from a relational database is converted to an XML document as defined by way of an XML schema.

An XML Schema is an XML vocabulary for describing XML instance documents. The term "instance" is used because a schema describes a class of documents, of which there can be many different instances.

The elements used in a schema definition come from the http://www.w3.org/2001/XMLSchema namespace. Schema definitions must have a root xsd:schema element. There are a variety of elements that may be nested within xsd:schema including, but not limited to, xsd:element, xsd:attribute, and xsd:complexType, all of which are well known in the art. A schema definition can be processed with standard XML tools and services such as DOM, SAX, XPath, and XSLT.

Definitions placed within the xsd:schema element are automatically associated with the namespace specified in the targetNamespace attribute. The namespace identifier is the key that links XML documents to the corresponding Schema definition. To take advantage of the schema while processing an element, the processor needs to locate the correct schema definition. How schema processors locate the schema definition for a particular namespace is not defined by a standard specification. Most processors, however, allow an in-memory cache loading of schemas that it will use while processing documents.

XML Schema also provides the schemaLocation attribute to provide a hint in the instance document as to the whereabouts of the required schema definitions. The schemaLocation attribute is in the http:H/www.w3.org/2001/XMLSchema-instance namespace, which was set aside specifically for attributes that are only used in instance documents.

FIG. 1B is a schematic representation of the mapping between data in relational tables 100 and 130 to an XML schema. The XML schema includes a root node 150, and customers nodes 150a, 150b, that implicate entries in the customers table 100. The child nodes of the customers nodes 150a, 150b may represent other columns in the customers table 100 or may represent data in a table related to the customers table 100. In the implementation depicted in FIG. 1B the customers nodes include CompanyName child nodes 156a, 156b corresponding to entries in the ComanyName column 114 in customers table 100, ContactName nodes 158a, 158b corresponding to entries in the ContactName column 116 in customers table 100, and orders child nodes 160a, 160b corresponding to orders in the order table 130.

The orders nodes 160a, 160b may have child nodes that correspond to columns in the order table 130. In the embodiment depicted in FIG. 1B the orders nodes 160a, 160b include CustomerID nodes 162a, 162b that correspond to entries in the OrderID column 134 of the orders table 130, OrderID nodes 164a, 164b that correspond to entries in the OrderID column of orders table 130, OrderDate nodes 166a, 166b that correspond to entries in the OrderDate column 136 of orders table 130, and DeliveryDate nodes 168a, 168b that correspond to entries in the DeliveryDate column 138 of orders table 130.

An Exemplary System Architecture

Figure 2:
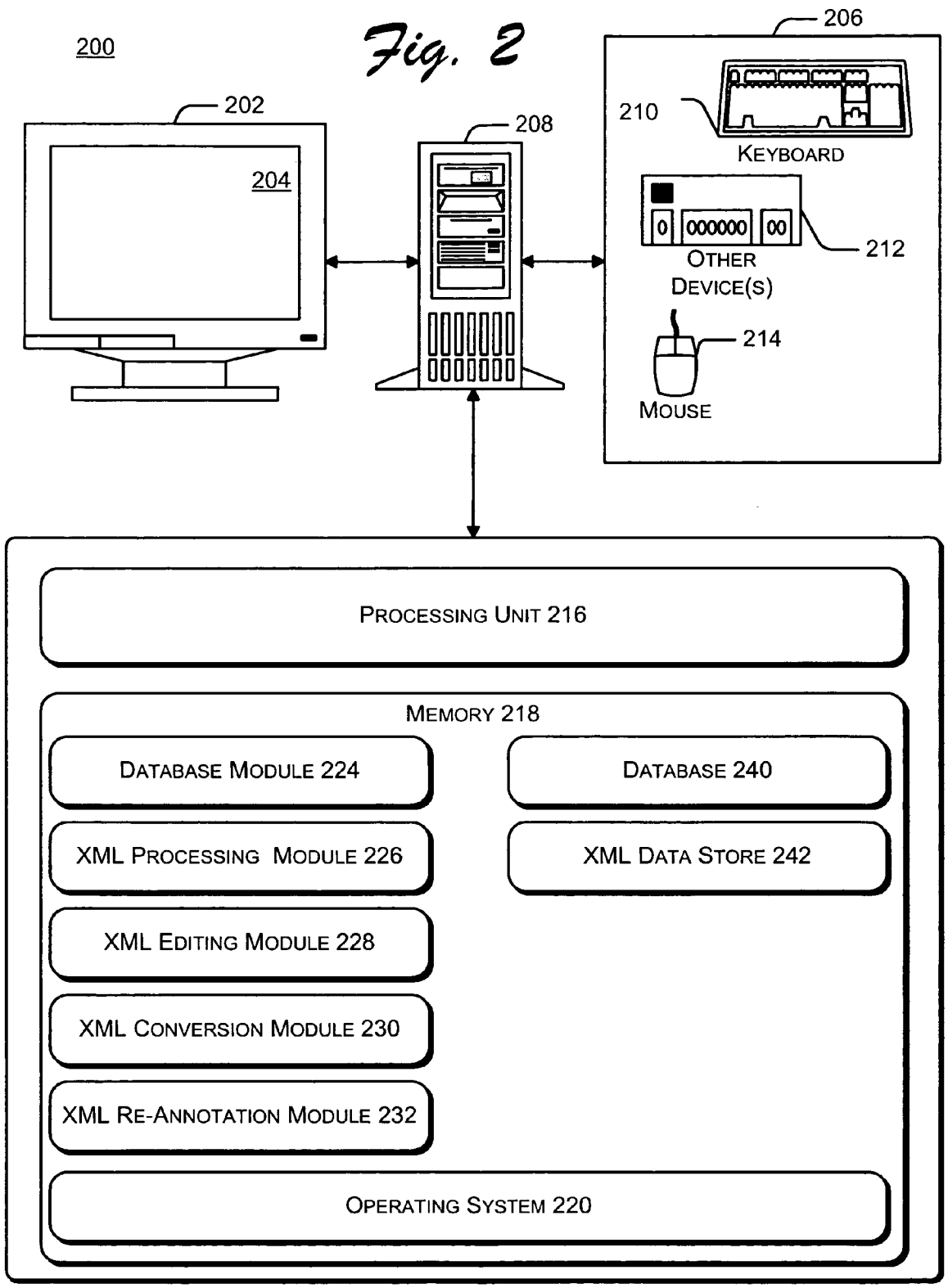
FIG. 2 is a schematic illustration of an exemplary system for managing structured XML documents containing hierarchical data.

FIG. 2 is a schematic depiction of an exemplary system 200 which may be used to manage XML documents containing hierarchical data. This system 200 includes a display 202 having a screen 204, one or more user-input devices 206, and a computer 208.

The user-input devices 206 can include any device allowing a computer to receive a developer's input, such as a keyboard 210, other device(s) 212, and a mouse 214. The other device(s) 212 can include a touch screen, a voice-activated input device, a track ball, and any other device that allows the system 200 to receive input from a developer. The computer 208 includes a processing unit 216 and random access memory and/or read-only memory 218. Memory 218 includes an operating system 220 for managing operations of computer 208 and one or more application programs, such as database module 220 that interfaces with a database 240 or other source of hierarchical data., an XML processing module 226, an XML editing module 228, an XML conversion module 230, and an XML re-annotation module 232. Memory 218 may further include an XML data store 242. XML data may be persisted (typically temporarily) in XML data store 242. The computer 208 communicates with a user and/or a developer through the screen 204 and the user-input devices 206.

The system 200 enables a user to retrieve hierarchical data from the database 240, display the data on display 202 using XML formatting techniques, manipulate the retrieved data in its XML format, and to return the manipulated XML data back to database 240. System 200 also monitors changes to the data to provide a measure of data integrity. The operation of various modules 224-232 is explained in detail below.

Exemplary Operations

Figure 3:
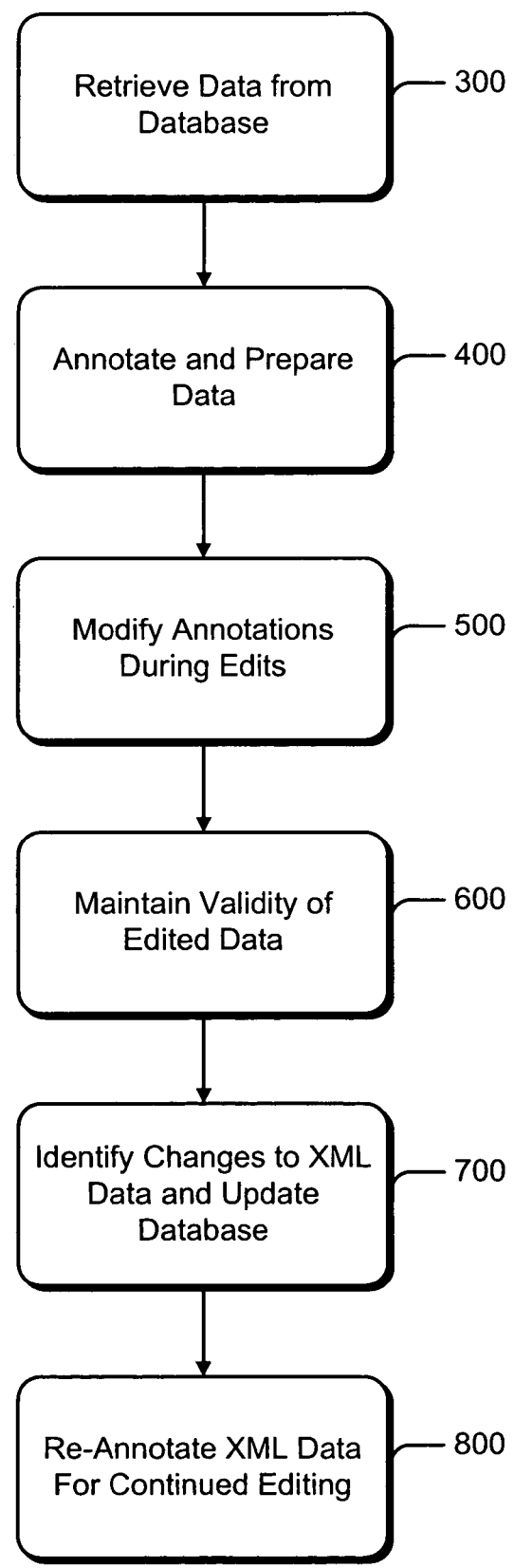
FIG. 3 is a flowchart illustrating operations in an exemplary method for managing XML documents containing hierarchical database information.

FIG. 3 is a flowchart illustrating operations in an exemplary method for managing XML documents containing hierarchical database information. Referring to FIG. 3, at operation 300 data is retrieved from a database. In an exemplary implementation the database may be a relational database such as database 240, and data may be retrieved by database module 224 using an XML-capable SQL service, as described above. At operation 400 the XML data is annotated and prepared for manipulation by the user(s) of the data, e.g., by XML processing module 226. At operation 500 the annotations are modified during editing operations to the XML data, e.g., by XML editing module 228. At operation 600 the validity of the edited data is maintained during editing operations, e.g., by XML editing module 228. At operation 700 changes to the XML data are identified and the database(s) are updated to reflect changes made to the XML data, e.g., by XML conversion module 230. At operation 800 the XML data is re-annotated for continued editing, if desired, e.g., by XML re-annotation module 232. Operations 400-800 are explained in greater detail below, with reference to FIGS. 4-7.

Figure 4:
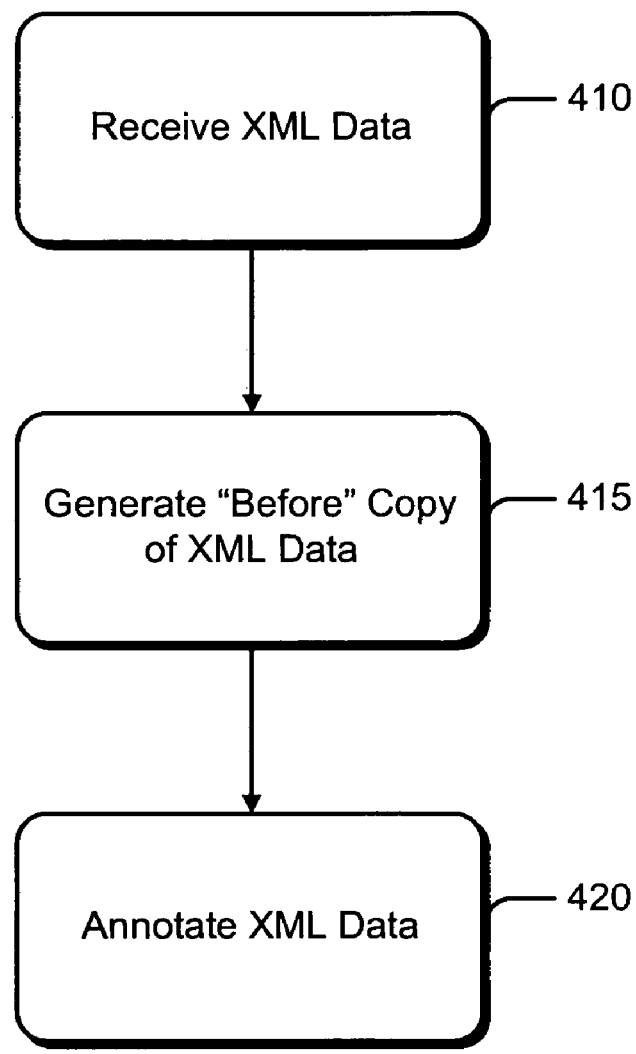
FIG. 4 is a flowchart illustrating operations in an exemplary method for preparing XML data retrieved from the database and annotating the XML data.

FIG. 4 is a flowchart illustrating operations in an exemplary method for preparing the XML data retrieved from the database and annotating the XML data and annotating the XML data. In an exemplary implementation the operations of FIG. 4 may be implemented by the XML processing module 226. At operation 410 the XML data is received from the database, e.g., as a result of an SQL query. At operation 415 a copy of the received XML data is generated. To distinguish the copy from the original retrieved XML data, the copy will be referred to herein as the before copy.

At operation 420 the original XML data is annotated in a manner that uniquely identifies each node in the XML data. Optionally, the before copy of the XML data may also be annotated. In an exemplary implementation each node in the XML data is annotated with a name and an identifier that identifies the position of the corresponding node in the before copy of the data. The annotated identifiers may be implemented as a numeric sequence, e.g., a sequential numeric listing, or a predetermined character sequence.

The identifier may be added to the XML data using a node attribute on each node to which an identifier is assigned. To avoid conflicts between the annotated identifier and other XML data the identifier attribute is assigned a namespace that is unique to the update algorithm. In addition, to avoid conflicts between identifiers in multiple XML documents the identifier attribute name is unique across multiple XML documents. In an exemplary implementation the attribute name may be randomly generated each time the XML data is prepared and annotated.

After the XML data is prepared and annotated it may be displayed as an XML document (e.g., on display 202) and modified, either automatically or by a user of system. During modification of the XML document data may be inserted into the XML document in several different ways. By way of example, data may be entered manually, moved (i.e., cut and pasted) from another part of the XML document, or another XML document, or copied and pasted from another part of the XML document, or another XML document.

Figure 5:
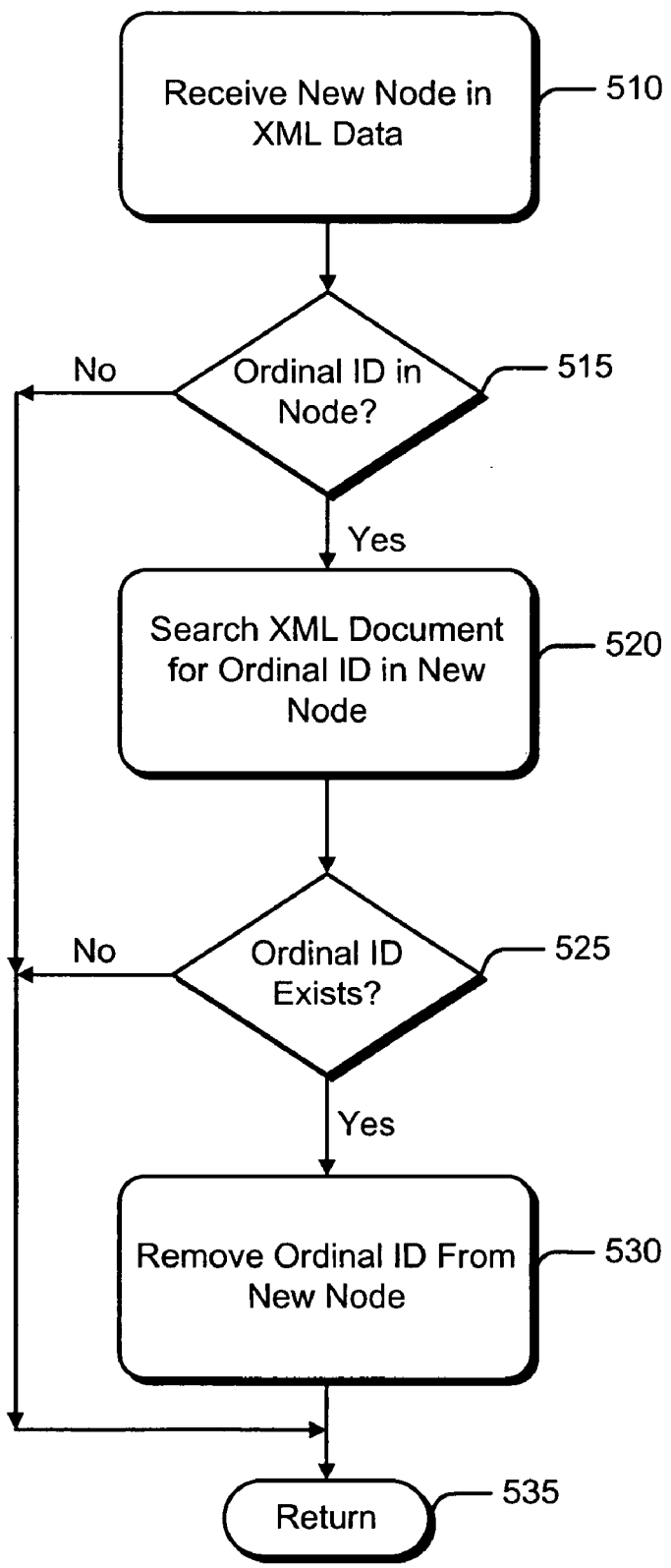
FIG. 5 is a flowchart illustrating operations in an exemplary method for modifying the XML annotations during editing operations to the XML data.

FIG. 5 is a flowchart illustrating operations in an exemplary method for modifying the XML annotations during editing operations to the XML data. In an exemplary implementation the operations of FIG. 5 may be performed by XML editing module 228. At operation 510 a new node is received in the XML data, e.g., as a result of a copy operation a move operation, or an insert operation. At operation 515 it is determined whether the new node includes an annotated identifier. If the new node does not include an annotated identifier, then the new node is likely to be a newly inserted node, and control is returned to the calling routine at operation 535.

By contrast, if at operation 515 there is an annotated identifier in the new node, then control passes to operation 520, and the XML document is searched for the annotated identifier. The search is performed based on the update algorithm namespace, the unique attribute name and the annotated identifier. If at operation 525 the annotated identifier exists in the XML document, then the new node is likely a copy of an existing node in the XML document. Accordingly, the annotated identifier is removed from the new node at operation 530.

By contrast, if the annotated identifier does not exist elsewhere in the XML document, then the new node likely represents a move operation of the data from elsewhere in the XML document. Accordingly, control can be returned to the calling routine at operation 535.

Figure 6:
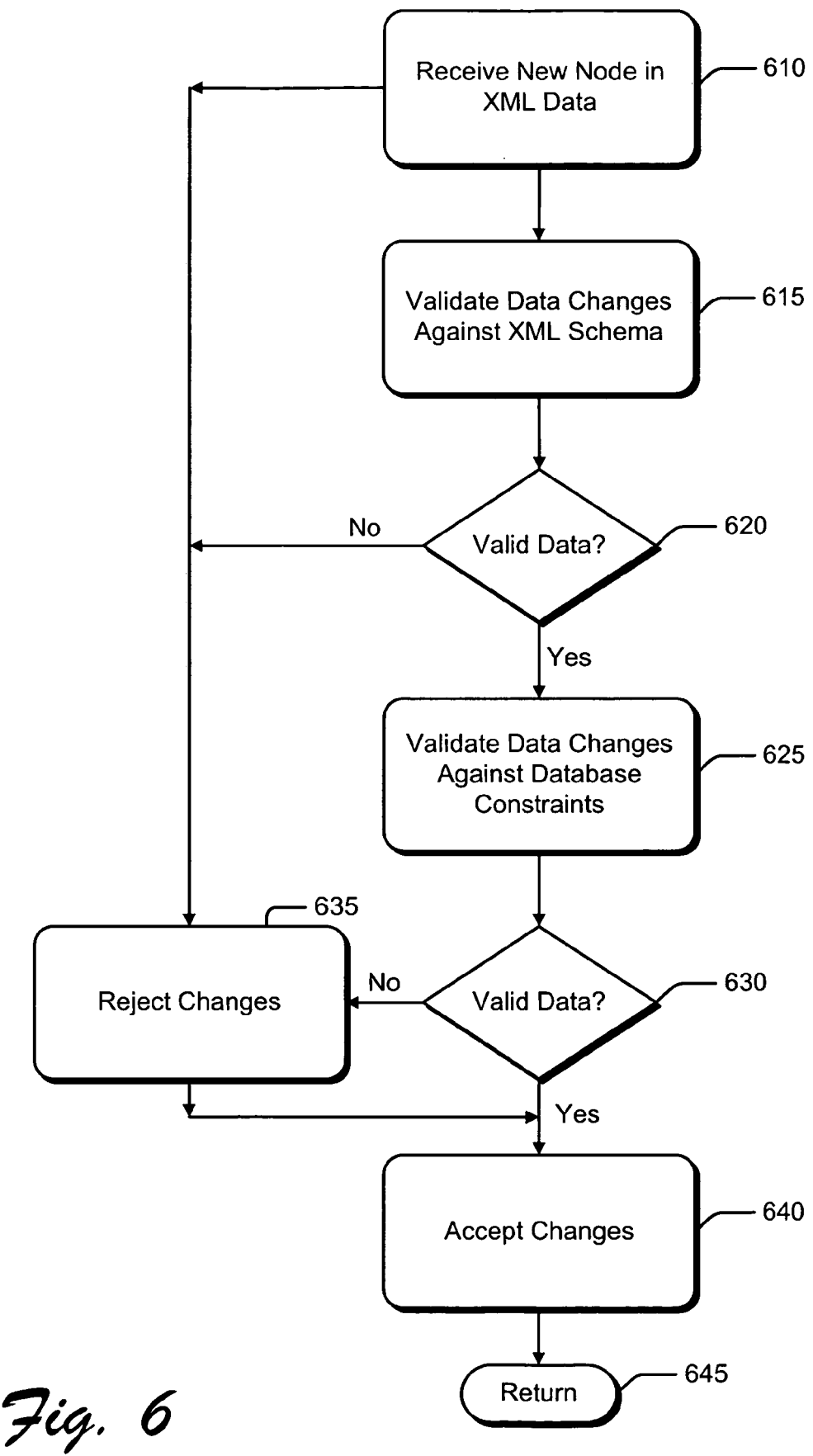
FIG. 6 is a flowchart illustrating operations in an exemplary method for maintaining the validity of the edited XML data during editing operations.

FIG. 6 is a flowchart illustrating operations in an exemplary method for maintaining the validity of the edited XML data. The operations of FIG. 6 may be performed contemporaneously with the operations of FIG. 5, and may be implemented by XML editing module 228. At operation 610 a new node is received in the XML data, as described above in connection with operation 510. At operation 615 the data changes are validated against the XML schema. If, at operation 620 the data changes are inconsistent with the XML schema, then control passes to operation 635 and the changes are rejected. By contrast, if the data changes are consistent with the XML schema, then control passes to operation 625 and the data changes are validated against database constraints. By way of example, the data may be validated to ensure that PrimaryKey—SecondaryKey constraints between rows in the database are not violated. If the data changes violate one or more database constraints, then control passes to operation 635 and the changes are rejected.

In an exemplary implementation, constraints are checked in a delayed manner before submit on rows with empty values for the Primary Key or the Foreign Key fields. This allows the user the ability to insert new rows with empty values and fill in those values at a later point in time.

Other features may be implemented to help a user enter correct data into an XML document. When the XML is represented hierarchically, with tables in a relation being nested, inserting a row into the child table will automatically populate foreign key values from the primary key of the parent row. For the case where the tables are not nested, if the insert happens from a view that knows the context of the parent row (e.g., the Master-Detail view) the Foreign-Key values may be populated automatically to match the Primary Key values of the current parent row.

Figure 7:
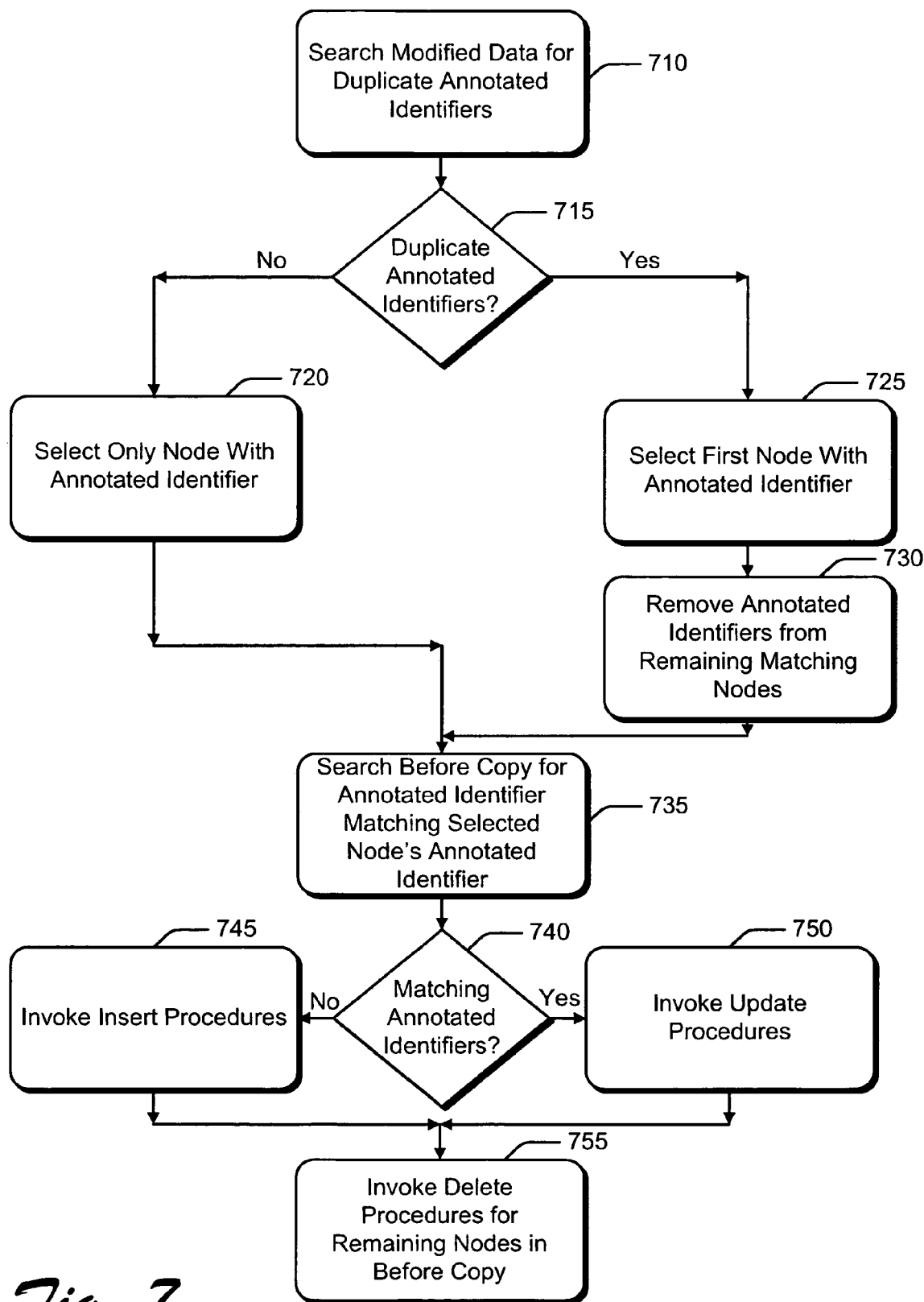
FIG. 7 is a flowchart illustrating operations in an exemplary method for identifying changes made to the edited XML data.

Once a series of edits to the XML has been completed and the information is ready to be posted back to the database, the operations of FIG. 7 are performed to identify changes to the data. The operations of FIG. 7 may be implemented by XML conversion module 230. At operation 710 the modified data is searched for duplicate annotated identifiers. In an exemplary implementation the search may be performed by traversing the nodes of the modified data tree and searching the remaining nodes for duplicates of the annotated identifier. If, at operation 715, a duplicate annotated identifier is located, then each duplicate is checked to determine whether it exists at the original location where that identifier was assigned. If one is found in the original position then that node is selected and the annotated identifiers are removed from the remaining matching nodes. If none of the nodes with a duplicate identifier exist at the original location then at operation 725 the first node in the data with the given annotated identifier is selected, and the annotated identifiers from the remaining matching nodes are removed. By contrast, if at operation 715 no duplicate annotated identifiers are located, then at operation 725 the only node in the data with the given annotated identifier is selected.

At operation 735 the before copy of the data is searched for an annotated identifier matching the selected annotated identifier. If, at operation 740, a matching annotated identifier is found in the before copy of the data, then update procedures are invoked to update the corresponding data in the database.

In an exemplary implementation, the update procedures may be implemented as follows. First, if there is no database column associated with the selected data item, it is skipped. Second, if the associated database column represents an identity or a datestamp or timestamp, it is skipped. Third, if the associated database column is part of the relationship between this node and its parent (i.e., a foreign key), then the corresponding value from the parent node is used. Fourth, if the value is empty and the database field is optional, it is updated with a null value. By contrast, if the database field is required, it is updated with an empty string. Fifth, the new value from the selected data item is used to update the row's corresponding column.

By contrast, if at operation 740 there are no matching annotated identifiers, then insert procedures are invoked to write the edited data back to the database(s). In an exemplary implementation, the insert procedures may be implemented as follows. First, if there is no database column associated with the data item, the entry is skipped. Second, if the associated database column is an identity or datestamp or timestamp, then it is skipped. Third, if the associated database column is part of the relationship between this node and its parent (i.e., a foreign key), then the corresponding value from the parent node is used. Fourth, if the value is empty and the database field is optional, then it is skipped. By contrast, if the database field is required, then it is inserted with an empty string. Fifth, the new value from the data item is used to populate the row's corresponding column.

The operations 735-750 may be repeated for each entry in the edited copy of the data to write the entries back to the database(s) from which the data was retrieved. At operation 755 delete procedures are invoked for any entries in the before copy of the data that were not processed as either an update or an insert. The delete procedures may be implemented by deleting the row(s) corresponding to the entry (or entries) in the before copy of the data.

If the XML document is going to continue to be used for editing, then the XML document is updated to reflect the changes that have been made. In an exemplary implementation the following operations may be performed, e.g., by the XML re-annotation module 232, to update the XML document. For each inserted row that contains an identity column (i.e., auto-numbered) the generated identity value may be propagated back into the corresponding node and data item in the XML Document. For each inserted or updated row that contains a date/timestamp column, the new generated value may be propagated back into the corresponding node and data item in the XML document. For any row that had data items updated based upon the relationship with its parent, these new values may be propagated back into the corresponding data items in the XML document. The XML Document may be re-annotated with unique identifiers. And fifth, a new copy of the. XML document is taken to become the new before data.

If the relationship between the querying and submit is not straight forward (such as when tracking changes to database data that is received via web services), the data may be marked as read only to prevent further modifications by the user. After the user refreshes the data explicitly, the lock on editing may be removed. This locking procedure ensures that the user does not work with potentially stale data.

Exemplary Operating Environment

Figure 8:
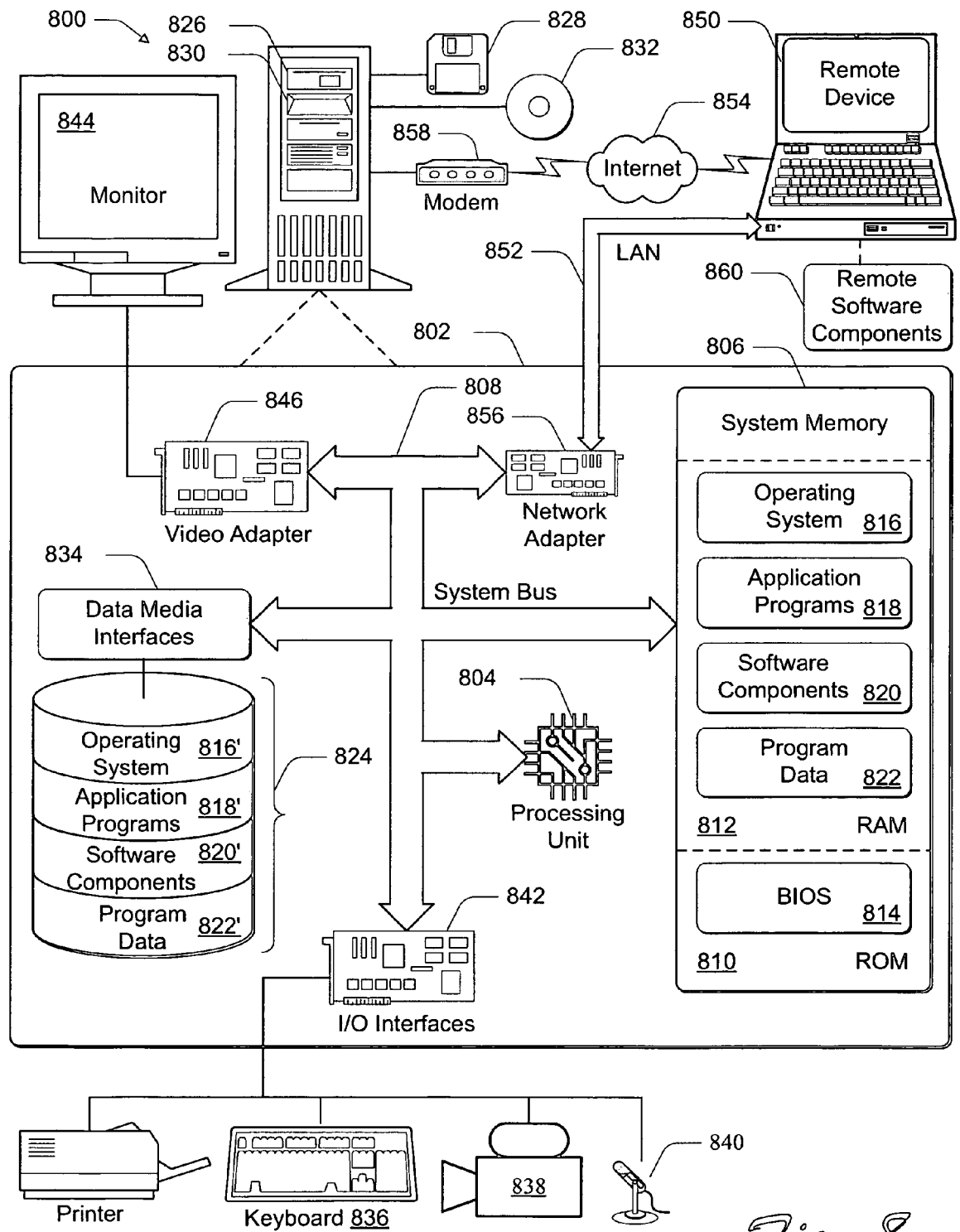
FIG. 8 is a schematic illustration of an exemplary computer system.

The various components and functionality described herein are implemented with a number of individual computers. FIG. 8 shows components of a typical example of a computer environment 800, including a computer, referred by to reference numeral 802. The computer 802 may be the same as or different from computer 102 of FIG. 1. The components shown in FIG. 8 are only examples, and are not intended to suggest any limitation as to the scope of the functionality of the invention; the invention is not necessarily dependent on the features shown in FIG. 8.

Generally, various different general purpose or special purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, network-ready devices, minicomputers, mainframe computers, distributed computing environments that include any of the above systems or devices, and the like.

The functionality of the computers is embodied in many cases by computer-executable instructions, such as software components, that are executed by the computers. Generally, software components include routines, programs, objects, components, data structures, etc. that perform particular tasks or implement particular abstract data types. Tasks might also be performed by remote processing devices that are linked through a communications network. In a distributed computing environment, software components may be located in both local and remote computer storage media.

The instructions and/or software components are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 8, the components of computer 802 may include, but are not limited to, a processing unit 804, a system memory 806, and a system bus 808 that couples various system components including the system memory to the processing unit 804. The system bus 808 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Computer 802 typically includes a variety of computer-readable media. Computer-readable media can be any available media that can be accessed by computer 802 and includes both volatile and nonvolatile media, removable and non-removable media. By way of example, and not limitation, computer-readable media may comprise computer storage media and communication media. "Computer storage media" includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 802. Communication media typically embodies computer-readable instructions, data structures, program modules or other data in a modulated data signal such as a carrier wave or other transport mechanism and includes any information delivery media. The term "modulated data signal" means a signal that has one or more if its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 806 includes computer storage media in the form of volatile and/or nonvolatile memory such as read only memory (ROM) 810 and random access memory (RAM) 812. A basic input/output system 814 (BIOS), containing the basic routines that help to transfer information between elements within computer 802, such as during start-up, is typically stored in ROM 810. RAM 812 typically contains data and/or software components that are immediately accessible to and/or presently being operated on by processing unit 804. By way of example, and not limitation, FIG. 8 illustrates operating system 816, application programs 818, software components 820, and program data 822.

The computer 802 may also include other removable/non-removable, volatile/nonvolatile computer storage media. By way of example only, FIG. 8 illustrates a hard disk drive 824 that reads from or writes to non-removable, nonvolatile magnetic media, a magnetic disk drive 826 that reads from or writes to a removable, nonvolatile magnetic disk 828, and an optical disk drive 830 that reads from or writes to a removable, nonvolatile optical disk 832 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 824 is typically connected to the system bus 808 through a non-removable memory interface such as data media interface 834, and magnetic disk drive 826 and optical disk drive 830 are typically connected to the system bus 808 by a removable memory interface.

The drives and their associated computer storage media discussed above and illustrated in FIG. 8 provide storage of computer-readable instructions, data structures, software components, and other data for computer 802. In FIG. 8, for example, hard disk drive 824 is illustrated as storing operating system 816', application programs 818', software components 820', and program data 822'. Note that these components can either be the same as or different from operating system 816, application programs 818, software components 820, and program data 822. Operating system 816', application programs 818', software components 820', and program data 822'are given different numbers here to illustrate that, at a minimum, they are different copies. A user may enter commands and information into the computer 802 through input devices such as a keyboard 836, and pointing device (not shown), commonly referred to as a mouse, trackball, or touch pad. Other input devices may include source peripheral devices (such as a microphone 838 or camera 840 which provide streaming data), joystick, game pad, satellite dish, scanner, or the like. These and other input devices are often connected to the processing unit 802 through an input/output (I/O) interface 842 that is coupled to the system bus, but may be connected by other interface and bus structures, such as a parallel port, game port, or a universal serial bus (USB). A monitor 844 or other type of display device is also connected to the system bus 808 via an interface, such as a video adapter 846. In addition to the monitor 844, computers may also include other peripheral rendering devices (e.g., speakers) and one or more printers which may be connected through the I/O interface 842.

The computer may operate in a networked environment using logical connections to one or more remote computers, such as a remote device 850. The remote device 850 may be a personal computer, a network-ready device, a server, a router, a network PC, a peer device or other common network node, and typically includes many or all of the elements described above relative to computer 802. The logical connections depicted in FIG. 8 include a local area network (LAN) 852 and a wide area network (WAN) 854. Although the WAN 854 shown in FIG. 8 is the Internet, the WAN 854 may also include other networks. Such networking environments are commonplace in offices, enterprise-wide computer networks, intranets, and the like.

When used in a LAN networking environment, the computer 802 is connected to the LAN 852 through a network interface or adapter 856. When used in a WAN networking environment, the computer 802 typically includes a modem 858 or other means for establishing communications over the Internet 854. The modem 858, which may be internal or external, may be connected to the system bus 808 via the I/O interface 842, or other appropriate mechanism. In a networked environment, program modules depicted relative to the computer 802, or portions thereof, may be stored in the remote device 850. By way of example, and not limitation, FIG. 8 illustrates remote software components 860 as residing on remote device 850. It will be appreciated that the network connections shown are exemplary and other means of establishing a communications link between the computers may be used.

Conclusion

Although the described arrangements and procedures have been described in language specific to structural features and/or methodological operations, it is to be understood that the subject matter defined in the appended claims is not necessarily limited to the specific features or operations described. Rather, the specific features and operations are disclosed as preferred forms of implementing the claimed present subject matter.

What is claimed is:

1. A method of managing XML documents, comprising:
receiving an original XML document that includes information from a hierarchical database, the hierarchical database being distinct from the original XML document;
generating a copy of the original XML document;
annotating the original XML document with an identifier that uniquely identifies each node in the document and a corresponding node in the copy of the XML document;
accepting at least one edit operation to the original XML document;
modifying at least one annotation to the original XML document in response to the at least one edit operation;
identifying at least one change to the original XML document as a result of the at least one edit operation; and
updating the database to reflect the change to the original XML document.

2. The method of claim 1, wherein annotating the original XML document with an identifier that uniquely identifies each node in the document and a corresponding node in the copy of the XML document comprises assigning an annotated identifier to each node in the original XML document.

3. The method of claim 2, wherein the annotated identifier is characterized by an attribute that is assigned a namespace that uniquely identifies an update process.

4. The method of claim 3, wherein the attribute is characterized by a name that is randomly generated.

5. The method of claim 1, wherein:
annotating the original XML document with an identifier that uniquely identifies each node in the document and a corresponding node in the copy of the XML document comprises assigning an annotated identifier to each node in the original XML document; and
modifying at least one annotation to the original XML document in response to the at least one edit operation comprises removing the annotated identifier from one or more nodes that are copies of another node in the document.

6. The method of claim 1, wherein identifying at least one change to the original XML document as a result of the at least one edit operation comprises searching the original XML document for one or more new entries.

7. The method of claim 6, wherein updating the database to reflect the change to the original XML document comprises inserting the new entries into the database.

8. The method of claim 1, wherein updating the database to reflect the change to the original XML document comprises updating database data from the original XML document.

9. The method of claim 1, further comprising re-annotating the original XML document for further processing.

10. The method of claim 9, wherein re-annotating the original XML document comprises updating the XML document to reflect one or more changes to the database data.

11. A system for managing XML documents, comprising:
a computing device including a display, a user-input device, and a processing unit, and a memory module the memory module comprising:
a database module to retrieve data from a database, and to format and display the data in an original XML document, the database being distinct from the original XML document;
an XML processing module to generate a copy of the original XML document and to annotate at least one of the original XML document and the copy of the XML document with an identifier that uniquely identifies each node in the document;
an XML editing module to accept edits to the original XML document and to modify at least one annotation to the XML data in response to the at least one edit;
an XML conversion module to identify at least one change to the original XML document as a result of the at least one edit operation; and to update the database to reflect the change to the original XML document.

12. The system of claim 11, wherein the XML processing module assigns an annotated identifier to each node in the original XML document.

13. The system of claim 12, wherein the annotated identifier is characterized by an attribute that is assigned a namespace that uniquely identifies an update process.

14. The system of claim 13, wherein the attribute is characterized by a name that is randomly generated.

15. The system of claim 11, wherein:
the XML processing module assigns an annotated identifier to each node in the original XML document; and
the XML editing module removes the annotated identifier from one or more nodes that are copies of another node in the document.

16. The system of claim 11, wherein the XML conversion module searches the original XML document for one or more new entries.

17. The system of claim 16, wherein the XML conversion module inserts one or more new entries in the original XML document into the database.

18. The system of claim 11, wherein the XML conversion module updates the database to reflect the changes to the data in the original XML data.

19. The system of claim 11, wherein the XML re-annotation module re-annotates the original XML document for further processing.

20. The system of claim 19, wherein the XML re-annotation module updates the XML document to reflect one or more changes to the database data.

21. One or more computer-readable media comprising computer executable instructions that, when executed on a computer, direct the computer to:
receive an original XML document that includes information from a hierarchical database, the hierarchical database being distinct from the original XML document;
generate a copy of the XML document;
annotate at least one of the original XML document and the copy of the XML document with an identifier that uniquely identifies each node in the document;
accept at least one edit operation to the original XML document;
modify at least one annotation to the XML in response to the at least one edit operation;
identify at least one change to the original XML document as a result of the at least one edit operation; and
update the database to reflect the change to the original XML document.

22. The one or more computer-readable media of claim 21, further comprising computer executable instruction that, when executed, direct the computer to assign an annotated identifier to each node in the original XML document.

23. The one or more computer-readable media of claim 22, wherein the annotated identifier is characterized by an attribute that is assigned a namespace that uniquely identifies an update process.

24. The one or more computer-readable media of claim 23, wherein the attribute is characterized by a name that is randomly generated.

25. The one or more computer-readable media of claim 21, further comprising computer executable instruction that, when executed, direct the computer to:
   assign an annotated identifier to each node in the original XML document; and
   remove the annotated identifier from one or more nodes that are copies of another node in the document.

26. The one or more computer-readable media of claim 21, further comprising computer executable instruction that, when executed, direct the computer to search the original XML document for one or more new entries.

27. The one or more computer-readable media of claim 26, further comprising computer executable instruction that, when executed, direct the computer to insert the new entries into the database.

28. The one or more computer-readable media of claim 21, further comprising computer executable instruction that, when executed, direct the computer to update database data from the original XML document.

29. The one or more computer-readable media of claim 21, further comprising logic instructions that, when executed on a computer, cause the computer to re-annotate the original XML document for further processing.

30. The computer-readable media of claim 29, further comprising computer executable instruction that, when executed, direct the computer to update the XML document to reflect one or more changes to the database data.

31. A method of managing markup language documents, comprising:
   receiving an original markup language document that includes information from a hierarchical database, the hierarchical database being distinct from the original markup language document;
   generating a copy of the original markup language document;
   annotating the original markup language document or the copy of the markup language document with an identifier that uniquely identifies each node in the annotated markup language document and a corresponding node in the other markup language document;
   accepting at least one edit operation to the annotated markup language document;
   modifying at least one annotation to the annotated markup language document in response to the at least one edit operation;
   identifying at least one change to the annotated markup language document as a result of the at least one edit operation; and
   updating the database to reflect the change to the annotated markup language document.

* * * * *